(12) United States Patent
Matsumoto et al.

(10) Patent No.: US 8,687,322 B1
(45) Date of Patent: Apr. 1, 2014

(54) MAGNETIC RECORDING HEAD AND DISK DRIVE INCLUDING THE SAME

(71) Applicant: Kabushiki Kaisha Toshiba, Tokyo (JP)

(72) Inventors: Takuya Matsumoto, Tokyo (JP);
Tomoko Taguchi, Kunitachi (JP);
Kenichiro Yamada, Tokyo (JP);
Naoyuki Narita, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/792,932

(22) Filed: Mar. 11, 2013

(30) Foreign Application Priority Data

Sep. 14, 2012 (JP) .................. 2012-203687

(51) Int. Cl.
*G11B 5/127* (2006.01)
(52) U.S. Cl.
USPC ........................................ 360/125.3
(58) Field of Classification Search
CPC ............................. G11B 5/314; G11B 5/3146
USPC .............................................. 360/125.3, 128
See application file for complete search history.

(56) References Cited

U.S. PATENT DOCUMENTS

| | | | |
|---|---|---|---|
| 7,911,882 B2* | 3/2011 | Shimazawa et al. ....... | 369/13.33 |
| 8,081,397 B2* | 12/2011 | Funayama et al. ....... | 360/125.08 |
| 8,094,399 B2* | 1/2012 | Roppongi et al. ............... | 360/55 |
| 8,363,355 B2* | 1/2013 | Mochizuki et al. ......... | 360/125.3 |
| 2009/0052095 A1 | 2/2009 | Yamada et al. | |
| 2009/0059418 A1* | 3/2009 | Takeo et al. ...................... | 360/75 |
| 2009/0225465 A1* | 9/2009 | Iwasaki et al. ................... | 360/75 |
| 2010/0195247 A1 | 8/2010 | Mochizuki et al. | |
| 2010/0220415 A1 | 9/2010 | Yamada et al. | |
| 2011/0299192 A1 | 12/2011 | Yamada et al. | |
| 2011/0300409 A1 | 12/2011 | Yamada et al. | |
| 2012/0113542 A1 | 5/2012 | Igarashi et al. | |
| 2012/0268844 A1 | 10/2012 | Yamada et al. | |

FOREIGN PATENT DOCUMENTS

| | | |
|---|---|---|
| JP | 2009-070541 | 4/2009 |
| JP | 2010-182361 | 8/2010 |
| JP | 4590003 | 12/2010 |
| JP | 2012-104168 | 5/2012 |

* cited by examiner

*Primary Examiner* — Angel Castro
(74) *Attorney, Agent, or Firm* — Knobbe Martens Olson & Bear LLP

(57) ABSTRACT

According to one embodiment, a magnetic recording head of a disk drive includes a main pole configured to generate a magnetic field in a direction perpendicular to a recording layer of a recording medium, a write shield magnetic pole opposite to a trailing side of the main pole with a gap, a coil configured to excite a magnetic flux in a magnetic circuit, and a high-frequency oscillator provided between a tip portion of the main pole on a side of the recording medium and the write shield magnetic pole to generate a high-frequency magnetic field. The write shield magnetic pole includes an end face opposite to the high-frequency oscillator and the end face is formed so that a distance from the main pole increases with an increasing distance from the recording medium.

20 Claims, 31 Drawing Sheets

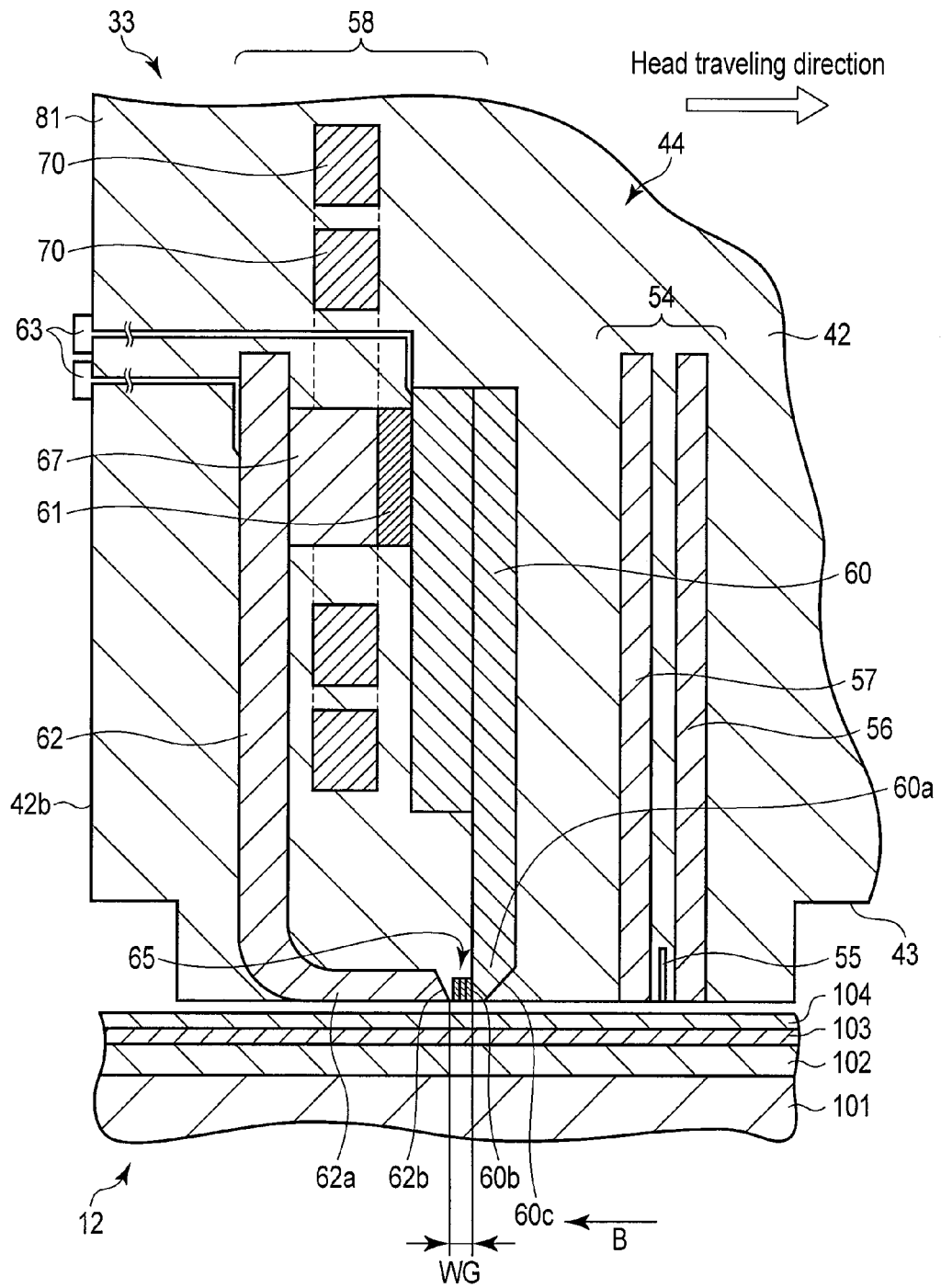
F I G. 3

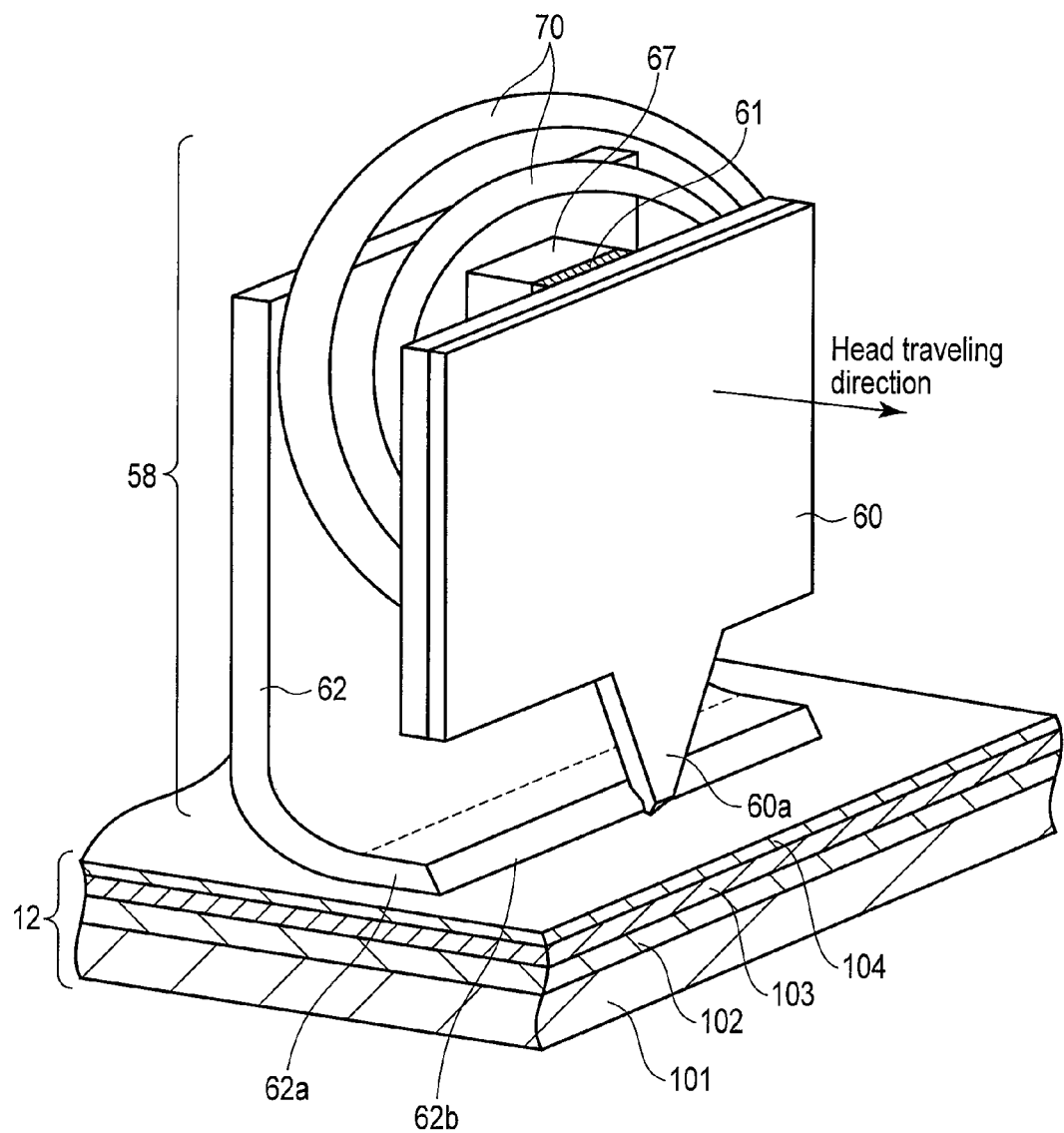
F I G. 4

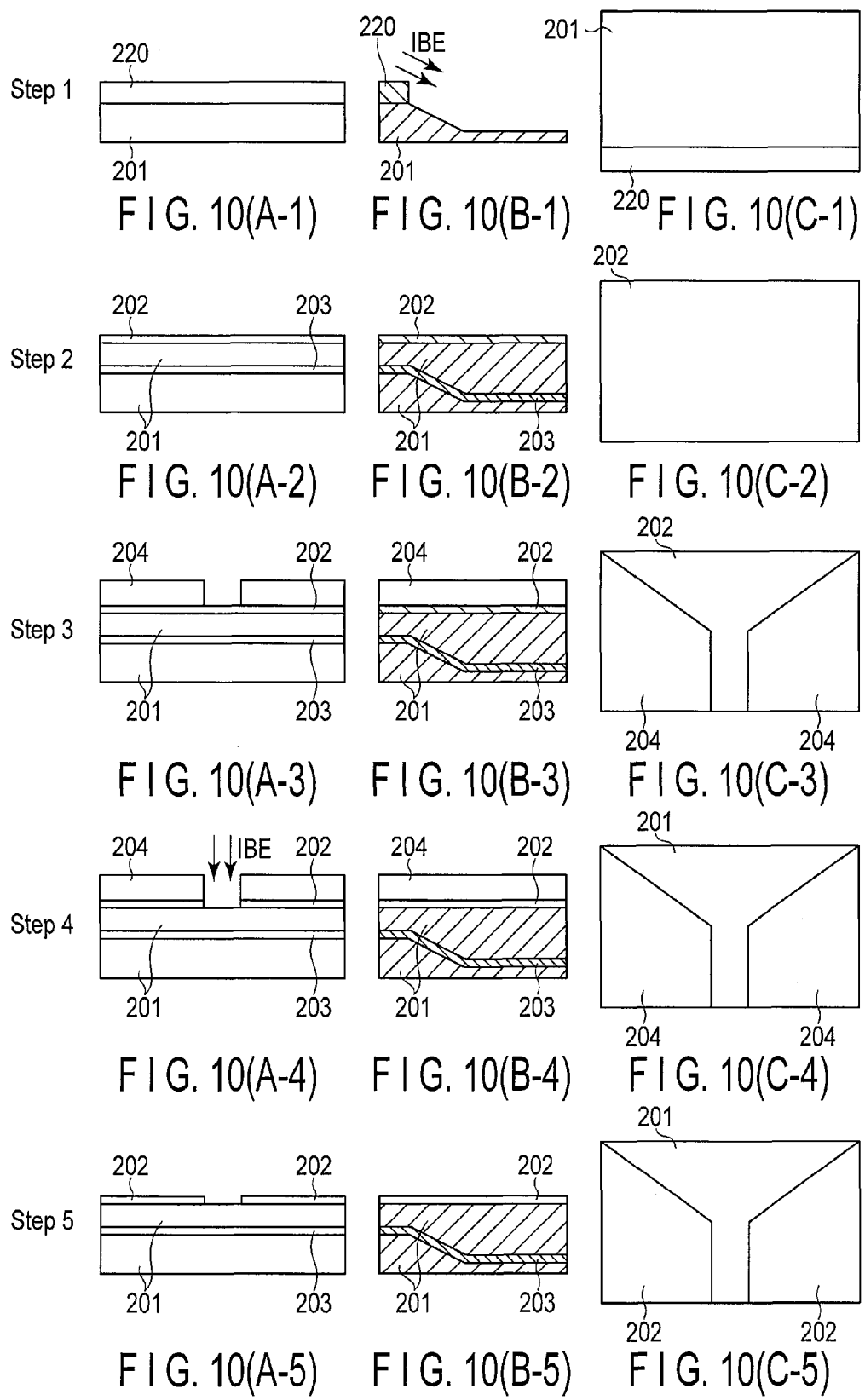

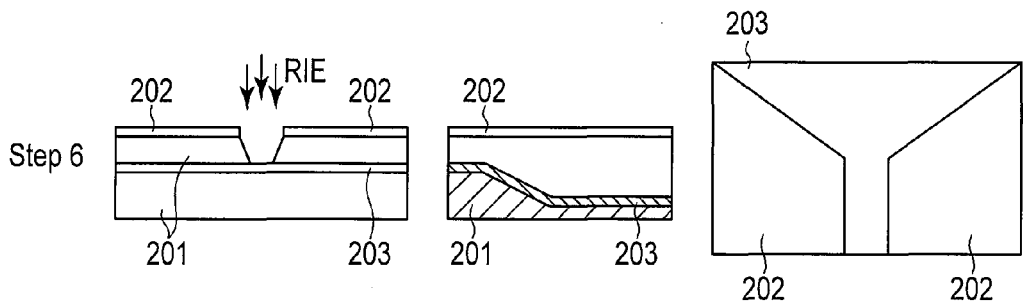
F I G. 11(A-6)    F I G. 11(B-6)    F I G. 11(C-6)
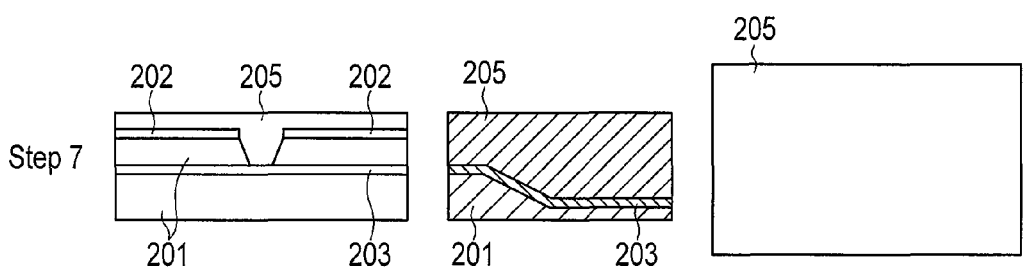
F I G. 11(A-7)    F I G. 11(B-7)    F I G. 11(C-7)
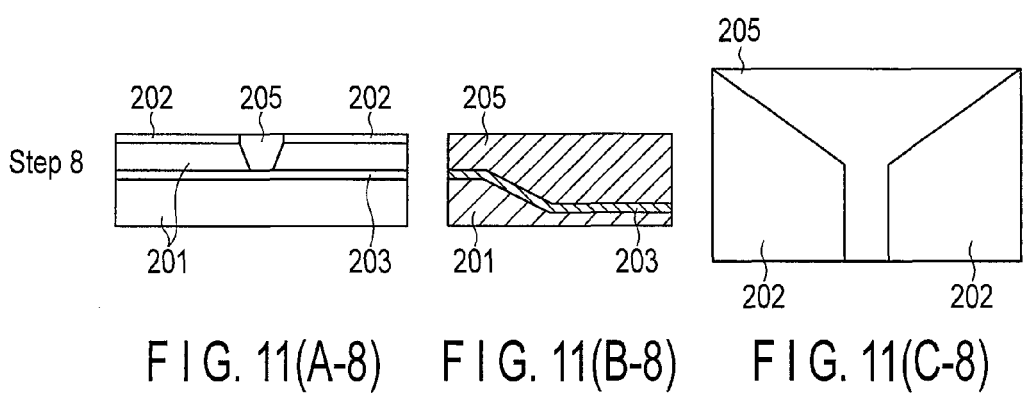
F I G. 11(A-8)    F I G. 11(B-8)    F I G. 11(C-8)
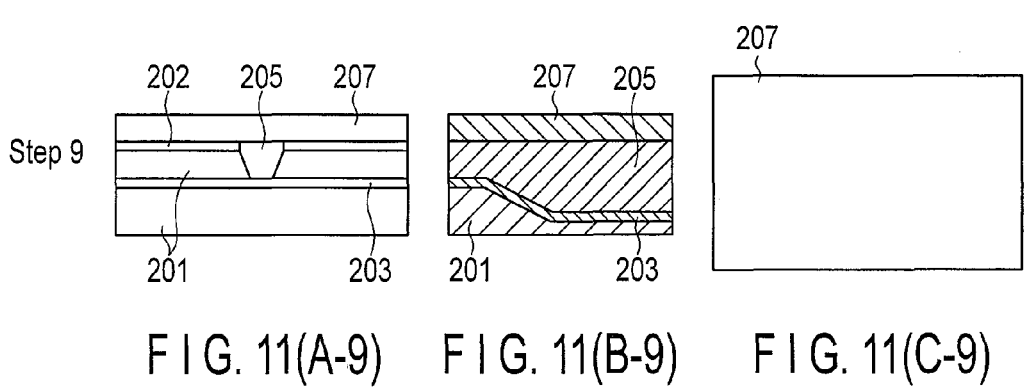
F I G. 11(A-9)    F I G. 11(B-9)    F I G. 11(C-9)

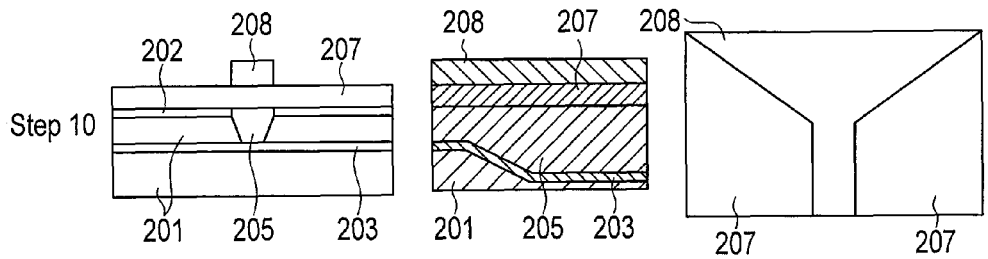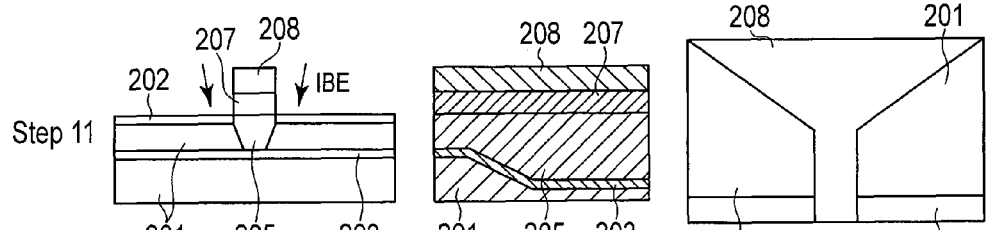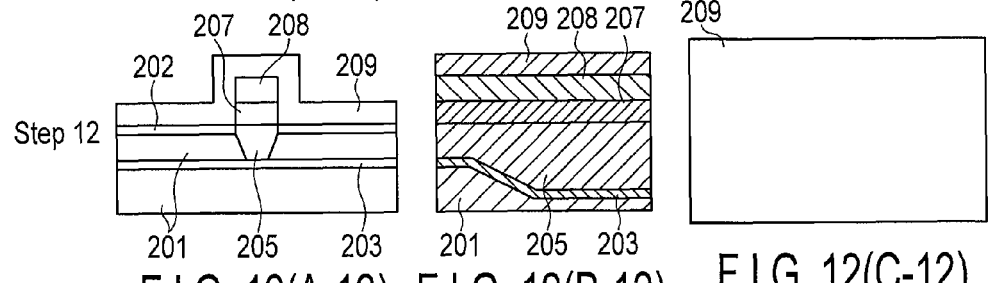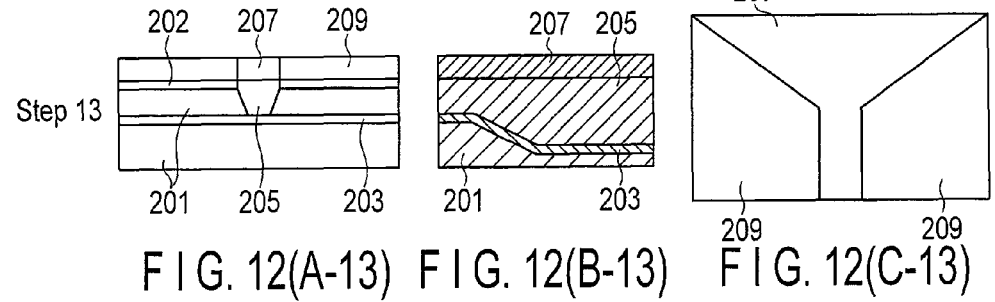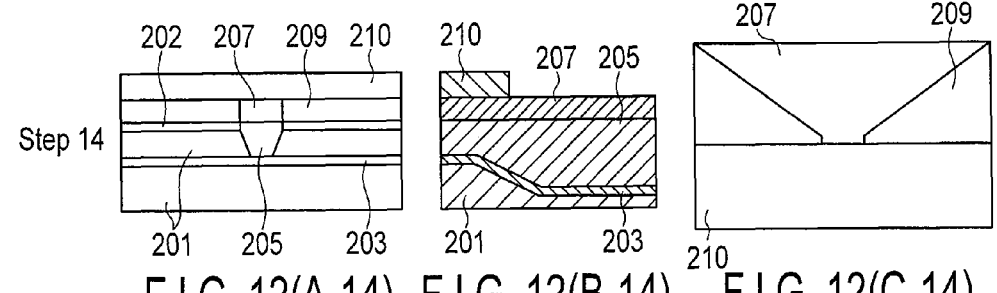

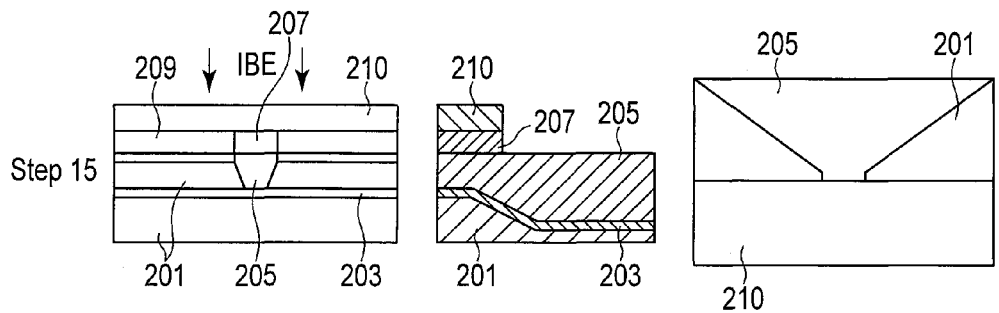
FIG. 13(A-15)   FIG. 13(B-15)   FIG. 13(C-15)
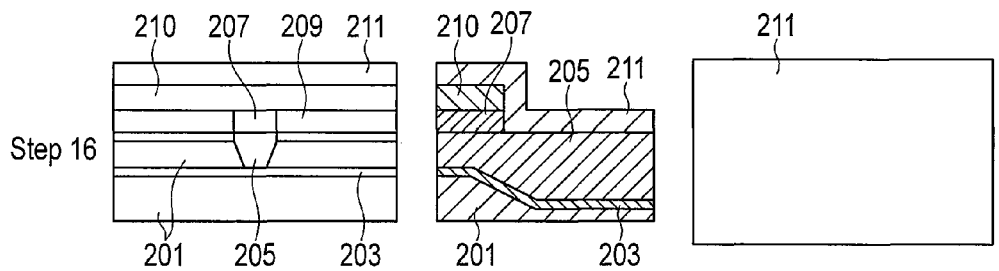
FIG. 13(A-16)   FIG. 13(B-16)   FIG. 13(C-16)
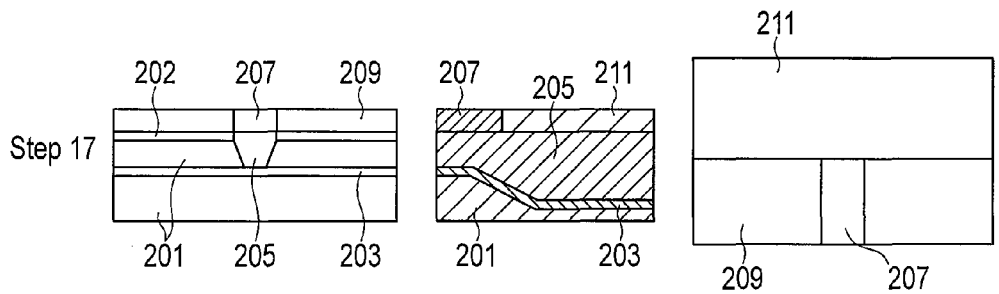
FIG. 13(A-17)   FIG. 13(B-17)   FIG. 13(C-17)

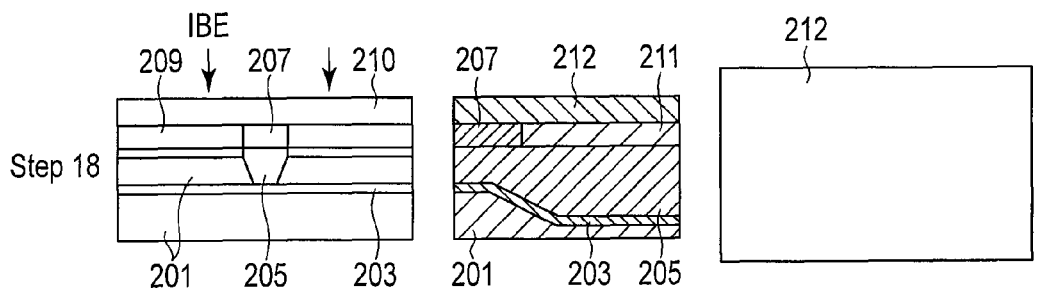
FIG. 14(A-18)  FIG. 14(B-18)  FIG. 14(C-18)
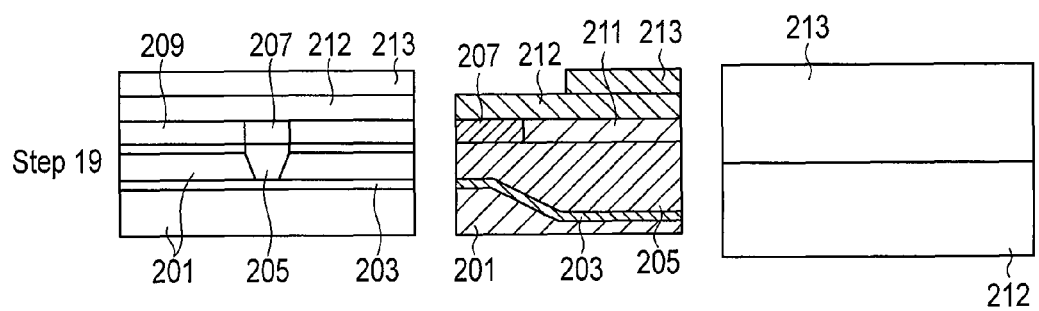
FIG. 14(A-19)  FIG. 14(B-19)  FIG. 14(C-19)
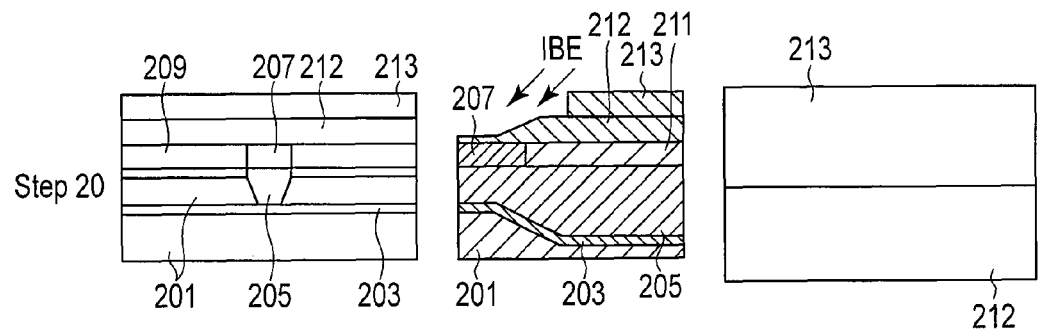
FIG. 14(A-20)  FIG. 14(B-20)  FIG. 14(C-20)
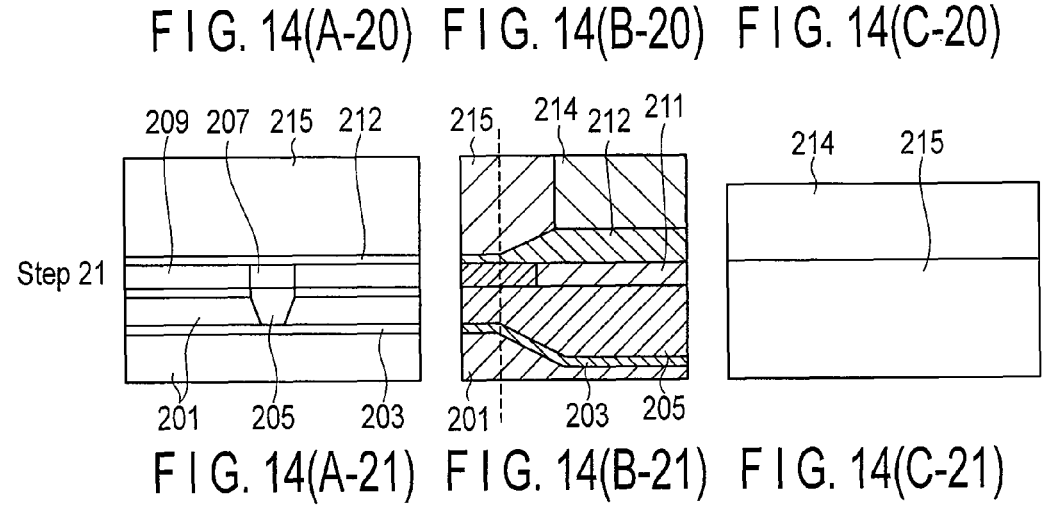
FIG. 14(A-21)  FIG. 14(B-21)  FIG. 14(C-21)

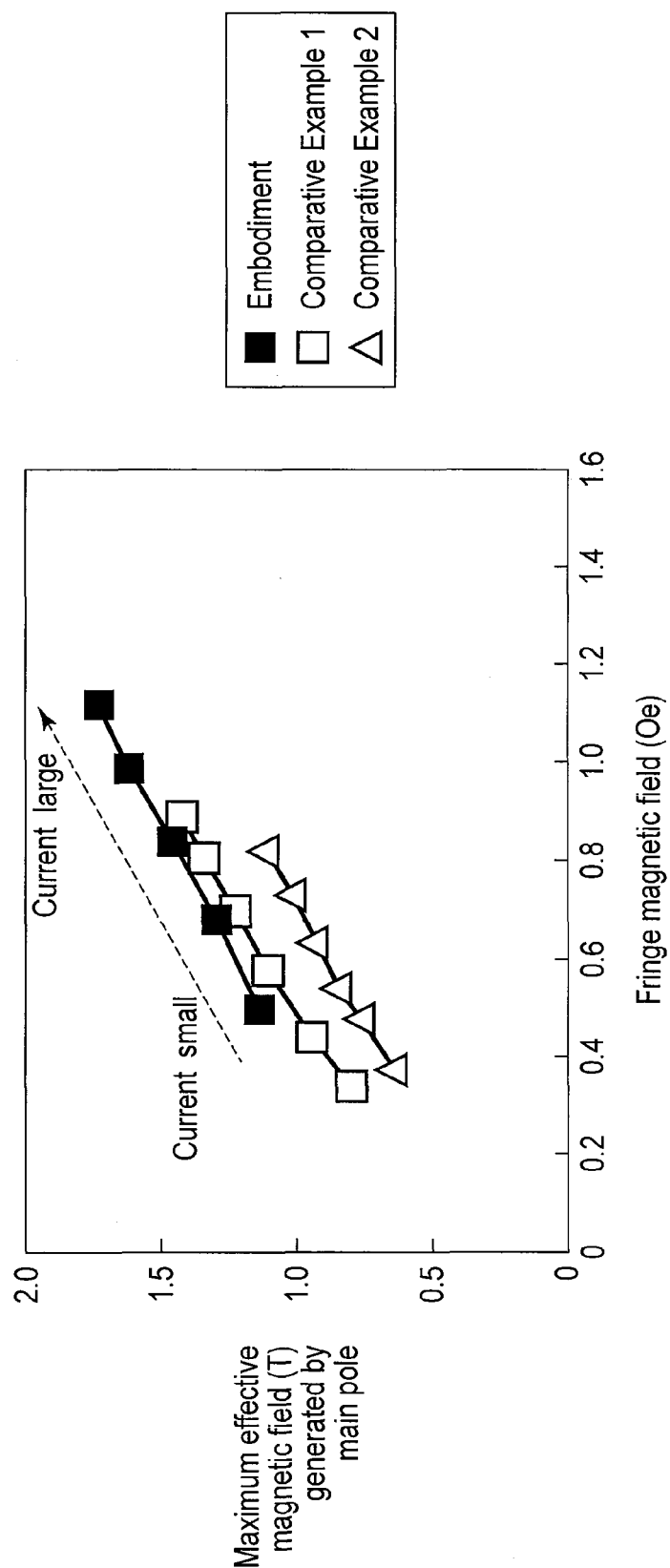
F I G. 16A

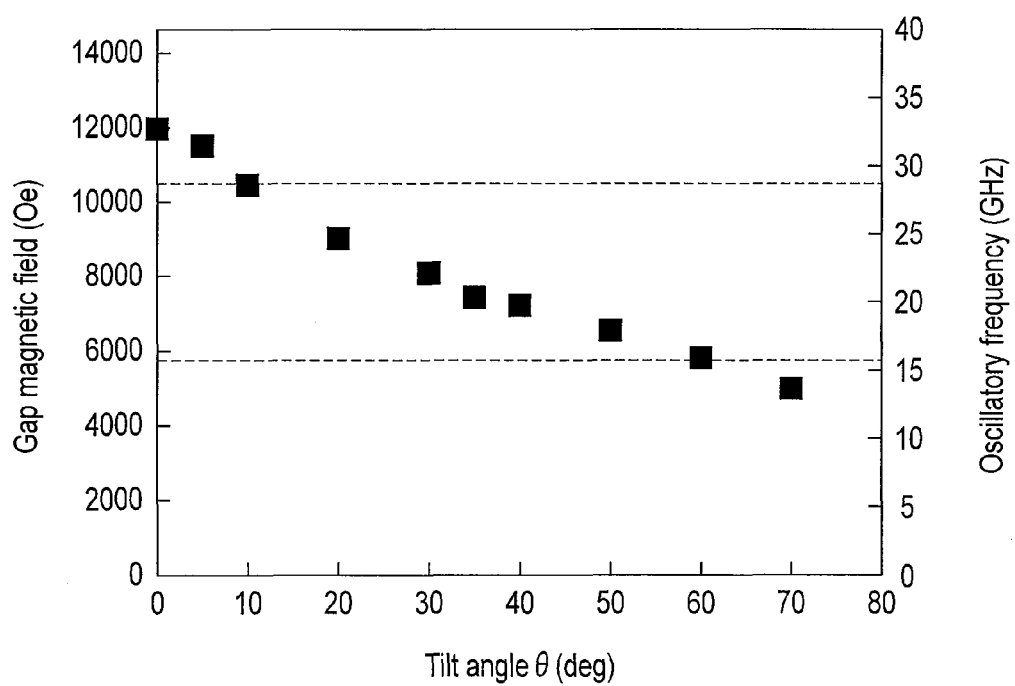
F I G. 20

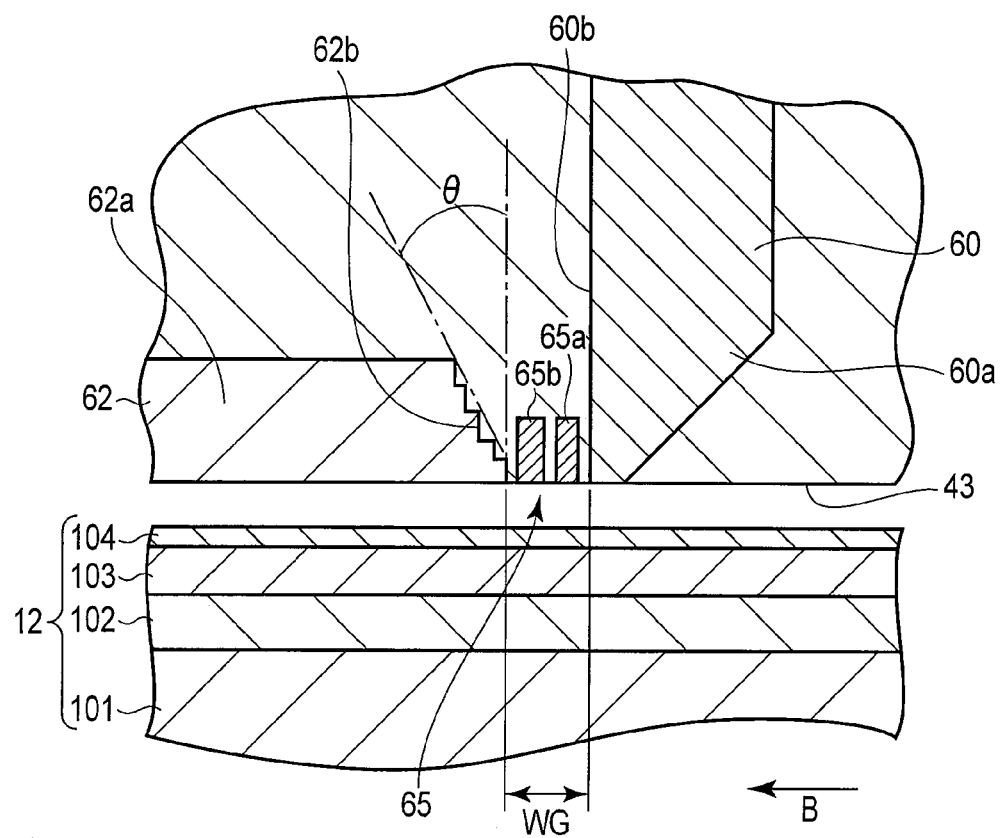
F I G. 22

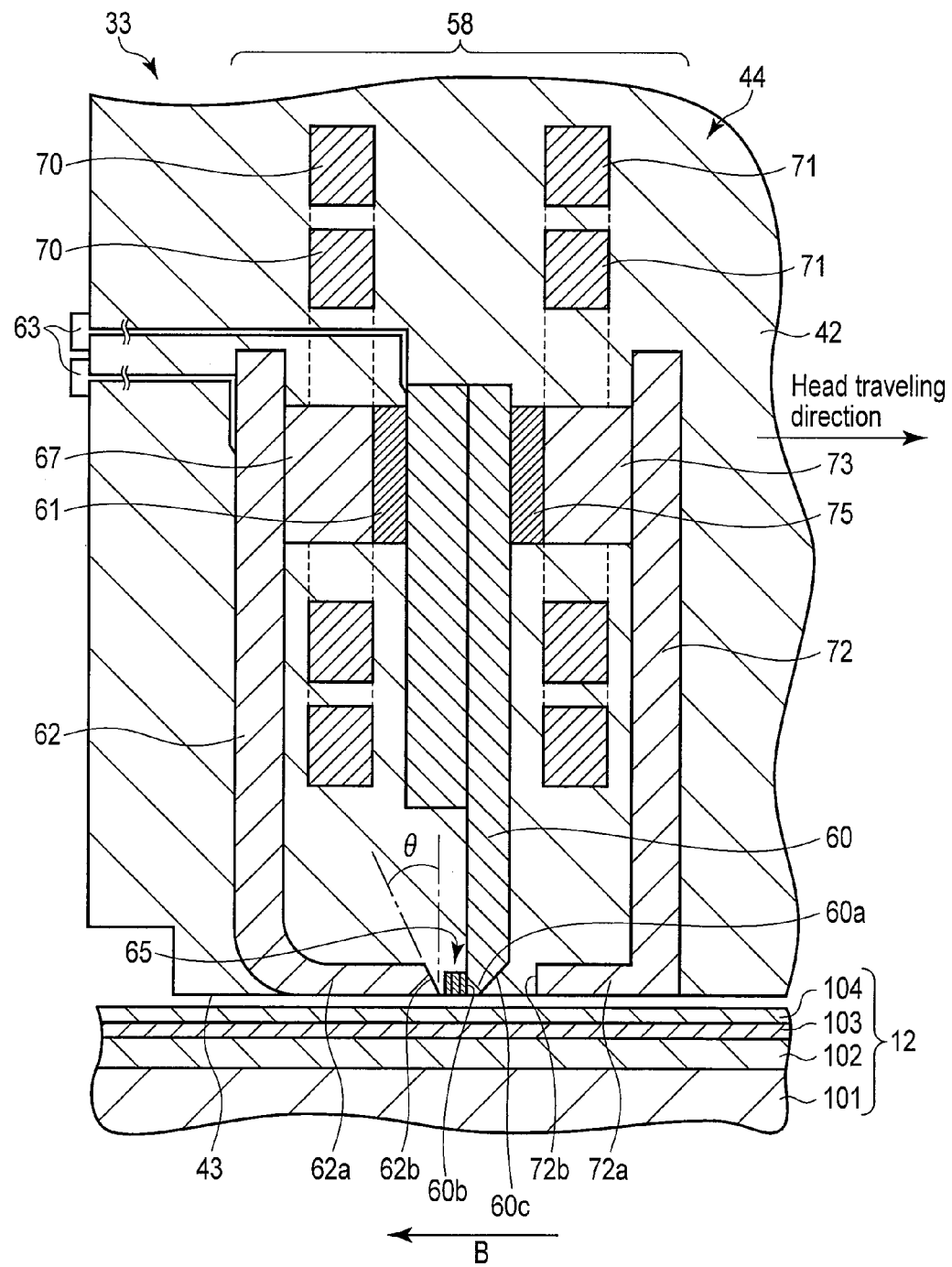
F I G. 24

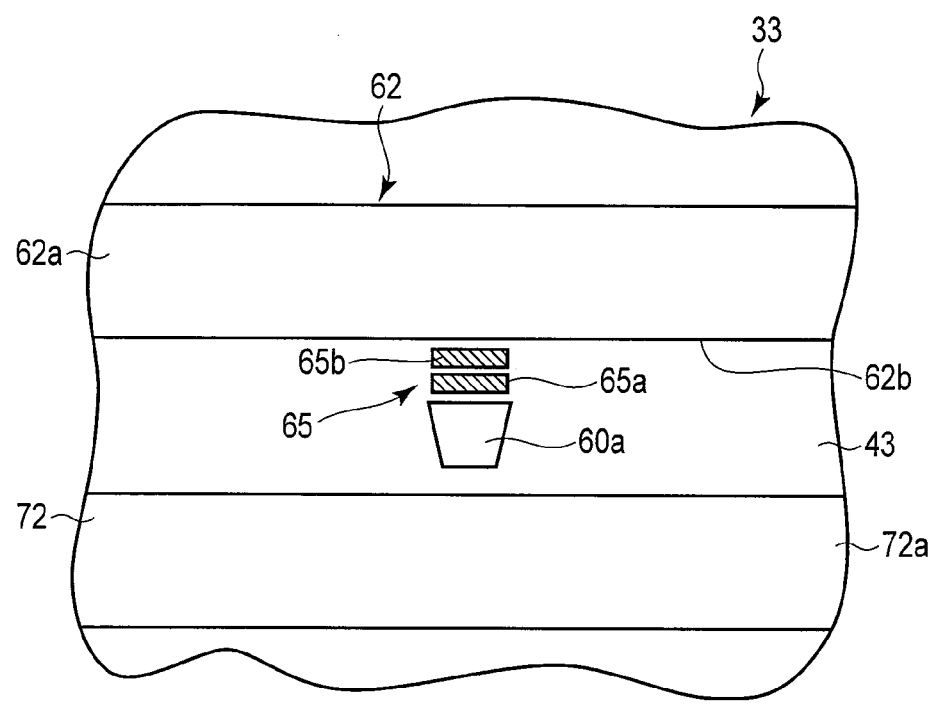
F I G. 26

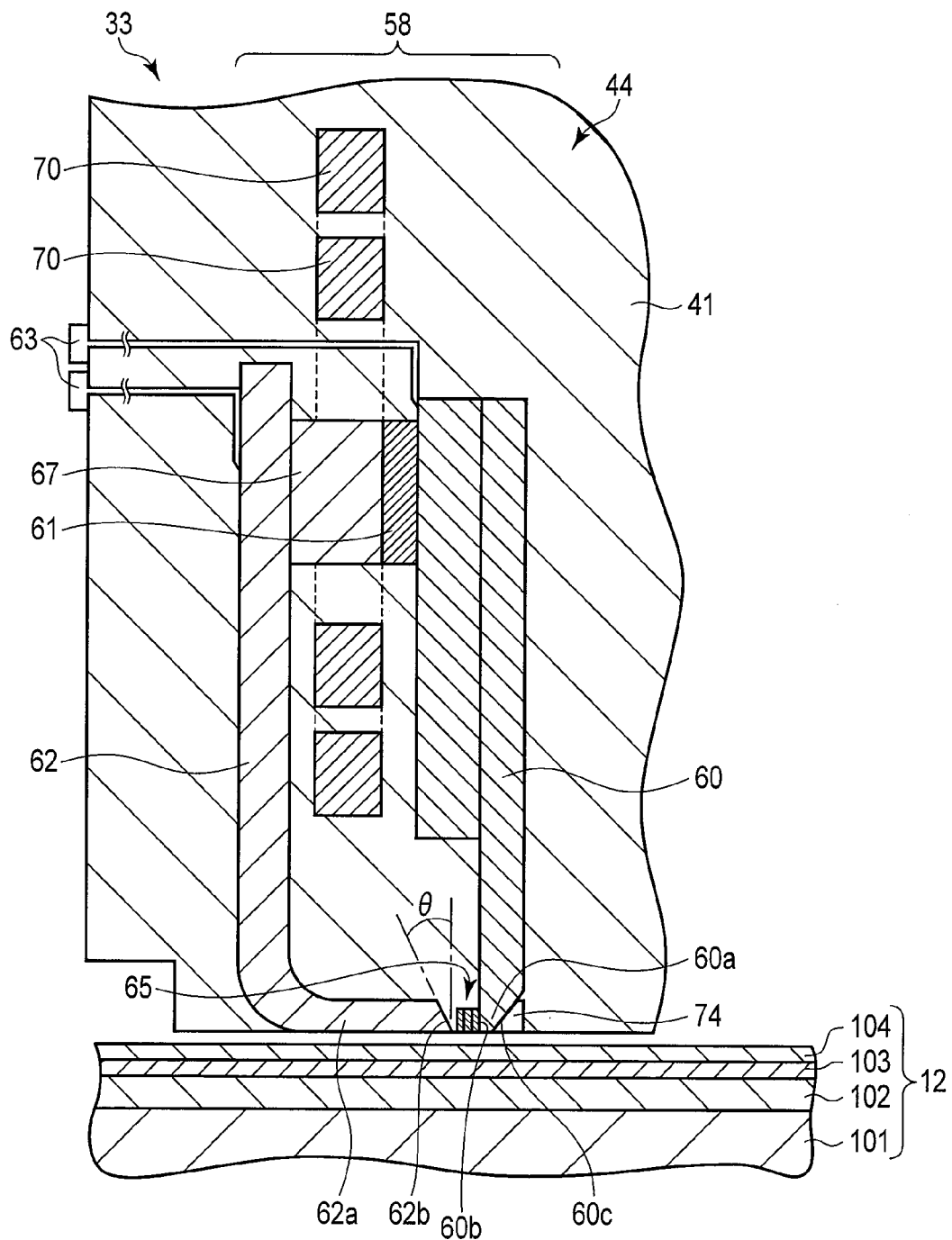
F I G. 27

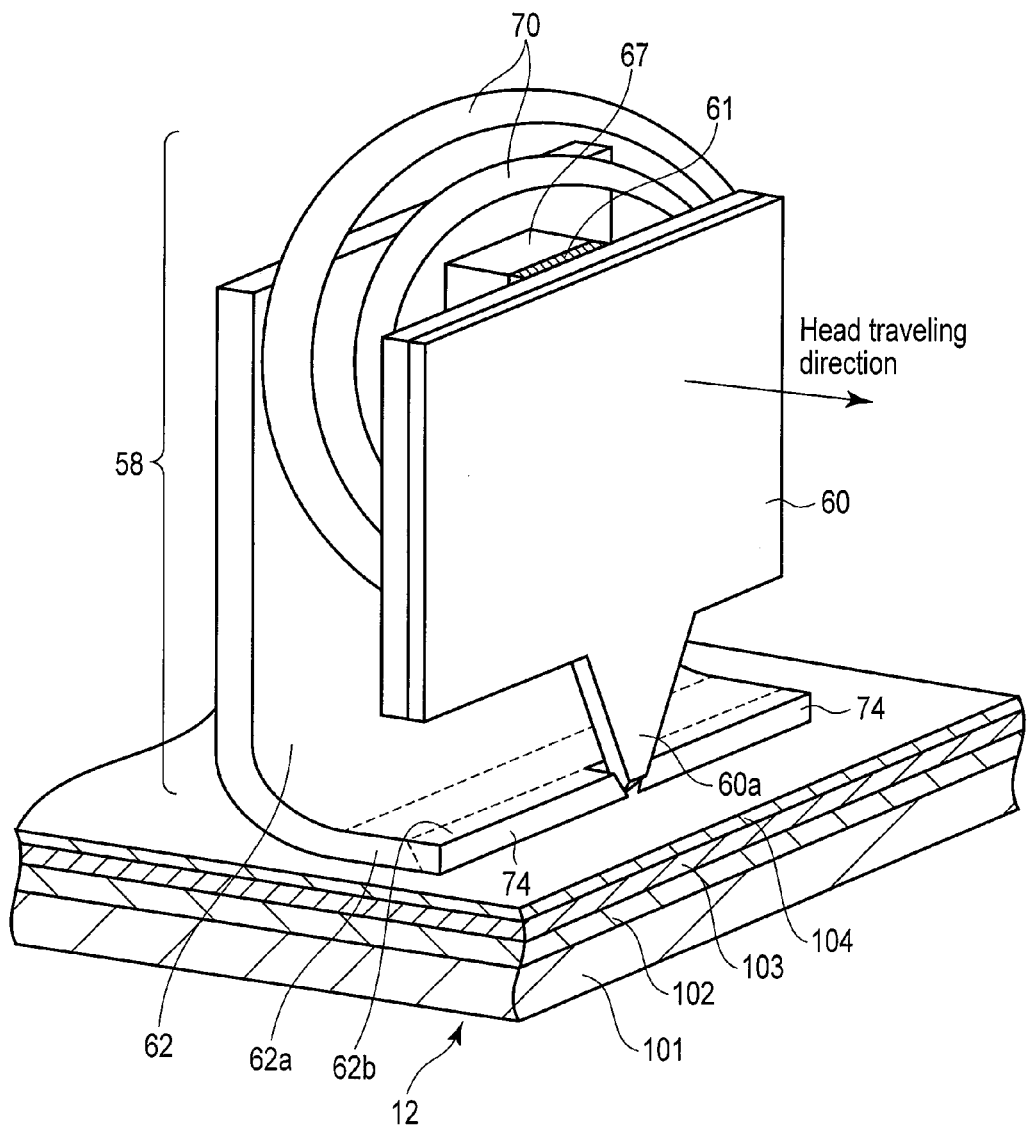
F I G. 28

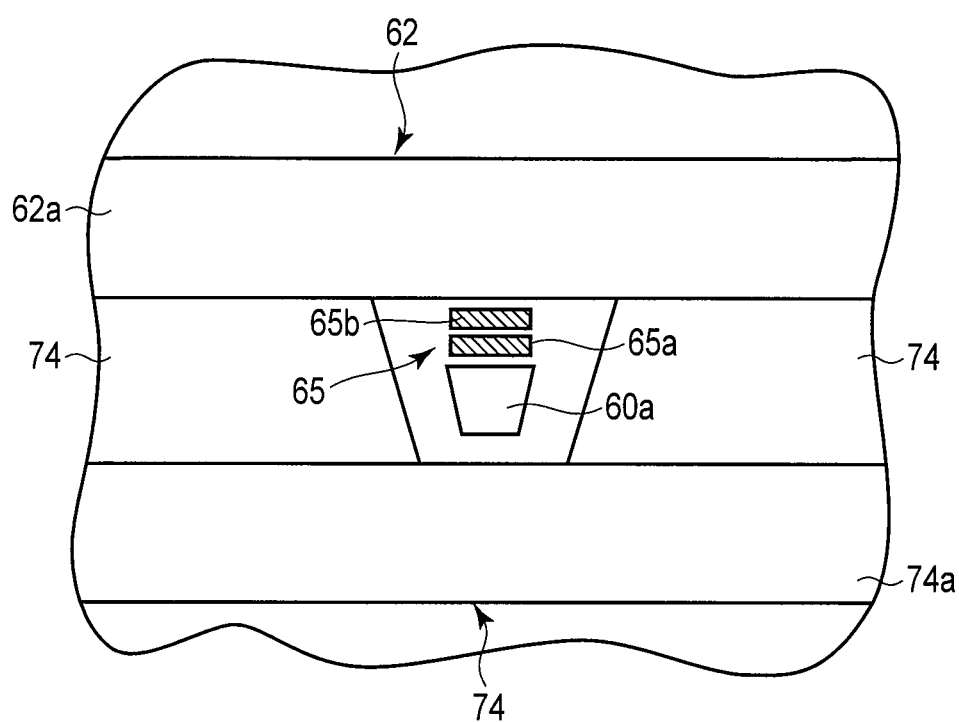
F I G. 32

MAGNETIC RECORDING HEAD AND DISK DRIVE INCLUDING THE SAME

CROSS-REFERENCE TO RELATED APPLICATIONS

This application is based upon and claims the benefit of priority from Japanese Patent Application No. 2012-203687, filed Sep. 14, 2012, the entire contents of which are incorporated herein by reference.

FIELD

Embodiments described herein relate generally to a magnetic recording head used for a disk drive and a disk drive including the magnetic recording head.

BACKGROUND

As a disk drive, for example, a magnetic disk drive includes a magnetic disk disposed in a case, a spindle motor that supports and rotates the magnetic disk, and a magnetic head that reads/writes data from/to the magnetic disk. The magnetic head has a slider mounted on a suspension and a head section provided in the slider and the head section includes a recording head for writing and a reproducing head for reading.

In recent years, magnetic heads for perpendicular magnetic recording have been proposed to achieve a higher recording density, a larger capacity, or a smaller size of a magnetic disk drive. In such a magnetic head, a recording head has a main pole that generates a perpendicular magnetic field, a write shield magnetic pole arranged on a trailing side of the main pole with a write gap therebetween to close a magnetic path to a magnetic disk, and a coil to pass a magnetic flux to the main pole. Further, a high-frequency assist head that passes a current to a high-frequency oscillator, for example, a spin torque oscillator provided between a medium-side end of the write shield magnetic pole and the main pole through the main pole and the write shield magnetic pole is proposed.

In a conventional magnetic head, the quality of recorded signals is improved by shortening a distance (=write gap length) between the main pole and the write shield magnetic pole in an ABS (air bearing surface) of a head slider to increase the gradient of a magnetic field generated by the main pole and to shorten a magnetic transition width on the recording medium.

Further, in a high-frequency assist head, like a conventional magnetic head, it is absolutely necessary to make the write gap length shorter. However, magnetic coupling between the main pole and the write shield magnetic pole becomes stronger by the write gap length being made shorter and thus, a gap magnetic field increases. As a result, if an attempt is made to increase the gradient of the head magnetic field from the main pole, the frequency of a high-frequency magnetic field applied to a recording medium becomes larger than the resonance frequency of the recording medium, causing a problem of degradation of recorded signal quality.

BRIEF DESCRIPTION OF THE DRAWINGS

FIG. 3 is a sectional view showing a head section of the magnetic head as an enlarged view;

FIG. 4 is a perspective view schematically showing a recording head of the magnetic head;

FIGS. 10(A-1) to 10(C-5) show plan views when the recording head in each manufacturing process of the recording head is viewed from the air bearing surface side, longitudinal sectional views of the recording head, and side views when the recording head is viewed from a trailing side;

FIGS. 11(A-6) to 11(C-9) show plan views when the recording head in each manufacturing process of the recording head is viewed from the air bearing surface side, longitudinal sectional views of the recording head, and side views when the recording head is viewed from the trailing side;

FIGS. 12(A-10) to 12(C-14) show plan views when the recording head in each manufacturing process of the recording head is viewed from the air bearing surface side, longitudinal sectional views of the recording head, and side views when the recording head is viewed from the trailing side;

FIGS. 13(A-15) to 13(C-17) show plan views when the recording head in each manufacturing process of the recording head is viewed from the air bearing surface side, longitudinal sectional views of the recording head, and side views when the recording head is viewed from the trailing side;

FIGS. 14(A-18) to 14(C-21) show plan views when the recording head in each manufacturing process of the recording head is viewed from the air bearing surface side, longitudinal sectional views of the recording head, and side views when the recording head is viewed from the trailing side;

FIG. 16A is a diagram showing relationships between a fringe magnetic field and the maximum effective magnetic field generated by the main pole for comparison for the magnetic recording heads according to the present embodiment and Comparative Examples 1, 2;

FIG. 20 is a diagram showing the relationship among a tilt angle θ of a leading side end face of the magnetic recording head, the gap magnetic field, and the oscillatory frequency;

FIG. 22 is a sectional view showing a tip portion of a magnetic recording head according to a first modification;

FIG. 24 is a sectional view showing a recording head of a magnetic head of an HDD according to a second embodiment;

FIG. 26 is a plan view when the recording head according to the second embodiment is viewed from the air bearing surface side;

FIG. 27 is a sectional view showing a recording head of a magnetic head of an HDD according to a third embodiment;

FIG. 28 is a perspective view schematically showing the recording head of the magnetic head of the HDD according to the third embodiment;

FIG. 32 is a plan view when the recording head according to the fourth embodiment is viewed from the air bearing surface side.

DETAILED DESCRIPTION

Various embodiments will be described hereinafter with reference to the accompanying drawings. In general, according to one embodiment, a magnetic recording head includes a main pole configured to generate a magnetic field in a direction perpendicular to a recording layer of a recording medium; a write shield magnetic pole opposite to a trailing side of the main pole with a gap; a coil configured to excite a magnetic flux in a magnetic circuit formed by the main pole and the write shield magnetic pole, and a high-frequency oscillator provided between a tip portion of the main pole on a side of the recording medium and the write shield magnetic pole to generate a high-frequency magnetic field, wherein the write shield magnetic pole includes an end face opposite to the high-frequency oscillator and the end face is formed so that a distance from the main pole increases with an increasing distance from the recording medium.

First Embodiment

Figure 1:
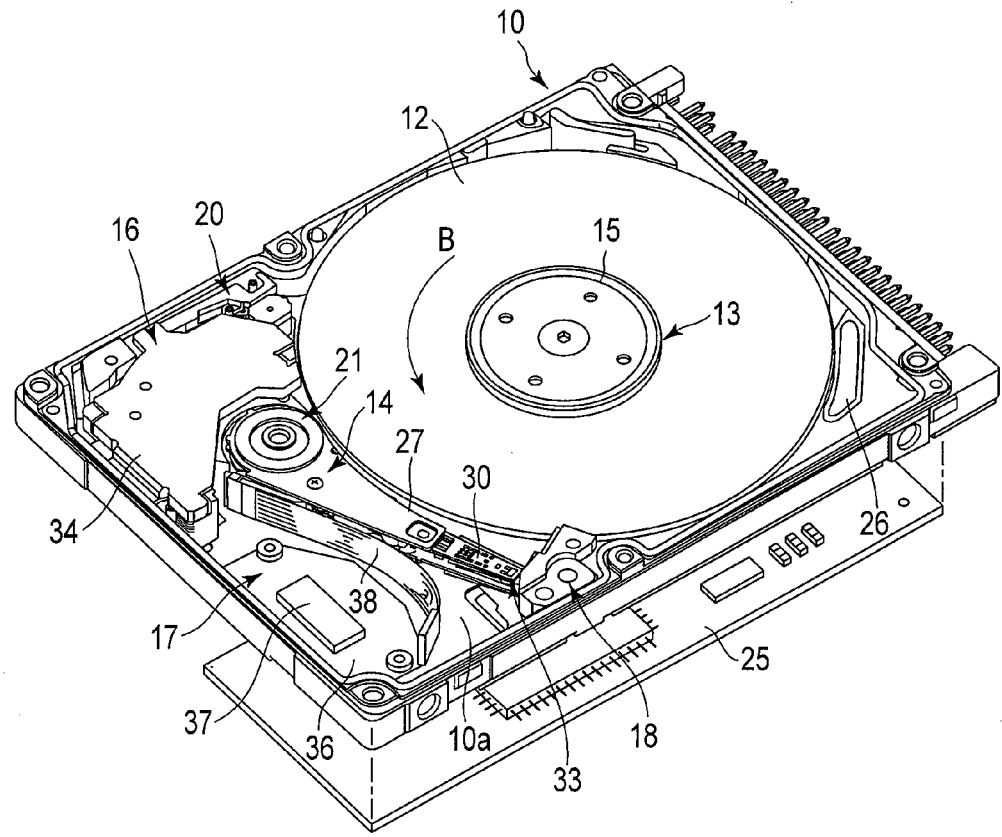
FIG. 1 is a perspective view showing a hard disk drive (hereinafter, called an HDD) according to a first embodiment.
Figure 2:
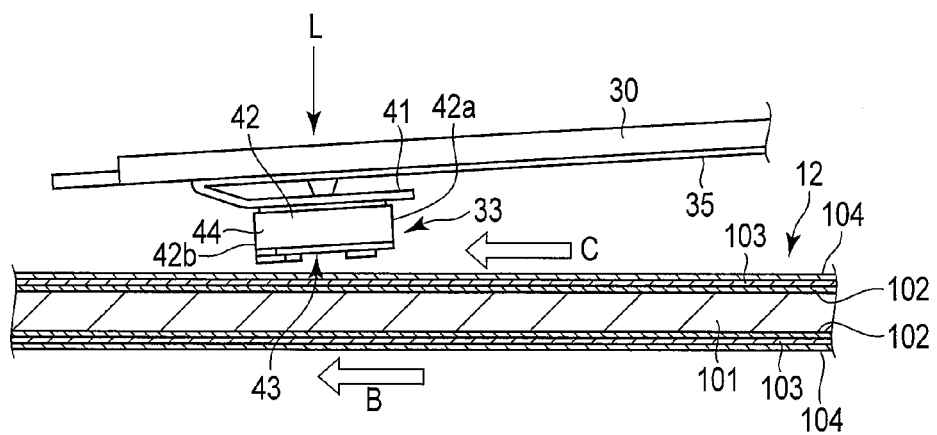
FIG. 2 is a side view showing a magnetic head and a suspension in the HDD.

FIG. 1 shows an internal structure of an HDD according to the first embodiment while a top cover thereof is removed and FIG. 2 shows a magnetic head in a floating state. As shown in FIG. 1, the HDD comprises a cabinet 10. The cabinet 10 comprises a base 10a in a rectangular box shape whose top surface is open and a top cover (not shown) in a rectangular plate shape. The top cover is screwed to the base 10a by a plurality of screws to close the upper-end opening of the base 10a. Accordingly, the inside of the cabinet 10 is maintained airtight and breathable to the outside only through a breathing filter 26.

A magnetic disk 12 as a recording medium and a drive section are provided on the base 10a. The drive section comprises a spindle motor 13 that supports and rotates the magnetic disk 12, a plurality of, for example, two magnetic heads 33 that record/reproduce information in/from the magnetic disk, a head actuator 14 that freely movably supports these magnetic heads 33 with respect to the surface of the magnetic disk 12, and a voice coil motor (hereinafter, called a VCM) 16 that moves rotationally and positions the head actuator. Also, a ramp load mechanism 18 that holds the magnetic head 33 in a position spaced apart from the magnetic disk 12 when the magnetic head 33 moves to the outermost circumference of the magnetic disk 12, a latch mechanism 20 that holds the head actuator 14 in a retreating position when an impact or the like acts on the HDD, and a substrate unit 17 on which electronic components like a preamplifier and head IC are mounted are provided on the base 10a.

A control circuit substrate 25 is screwed to the outer surface of the base 10a to be positioned opposite to the bottom wall of the base 10a. The control circuit substrate 25 controls operations of the spindle motor 13, the VCM 16, and the magnetic head 33 via the substrate unit 17.

As shown in FIG. 1, the magnetic disk 12 is mutually coaxially fitted to the hub of the spindle motor 13 and also clamped by a clamp spring 15 screwed to the upper end of the hub to be fixed to the hub. The magnetic disk 12 is rotated by the spindle motor 13 as a drive motor in an arrow B direction at a predetermined speed.

The head actuator 14 comprises a bearing 21 fixed onto the bottom wall of the base 10a and a plurality of arms 27 extending from the bearing 21. These arms 27 are positioned in parallel with the surface of the magnetic disk 12 at predetermined intervals and also extend in the same direction from the bearing 21. The head actuator 14 comprises an elastically deformable suspension 30 in an elongated plate shape. The suspension 30 is formed of a plate spring and the end face thereof is fixed to the tip of the arm 27 by spot welding or adhesion to extend from the arm 27. The suspension 30 may also be formed integrally with the corresponding arm 27. The magnetic head 33 is supported on an extending end of the suspension 30. The arm 27 and the suspension 30 constitute a head suspension and the head suspension and the magnetic head 33 constitute a head suspension assembly.

As shown in FIG. 2, the magnetic head 33 has a slider 42 in an approximately parallelopiped shape and a head section 44 for recording/reproduction provided at an outflow end (trailing end) of the slider. The magnetic head 33 is fixed to a gimbal spring 41 provided in a tip portion of the suspension 30. The magnetic head 33 has a head load L toward the surface of the magnetic disk 12 applied thereto by elasticity of the suspension 30. The two arms 27 are positioned parallel to each other at predetermined intervals and the suspensions 30 and the magnetic heads 33 mounted on these arms are opposite to each other across the magnetic disk 12.

The magnetic head 33 is electrically connected to a main FPC 38 described later via a relay flexible printed circuit board (hereinafter, referred to as a relay FPC) 35 fixed onto the suspension 30 and the arm 27.

As shown in FIG. 1, the substrate unit 17 has an FPC body 36 formed of a flexible printed circuit board and the main FPC 38 extending from the FPC body. The FPC body 36 is fixed to the bottom surface of the base 10a. Electronic components including a preamplifier 37 and a head IC are mounted on the FPC body 36. The extending end of the main FPC 38 is connected to the head actuator 14 to be connected to the magnetic head 33 via the relay FPC 35.

The VCM 16 has a support frame (not shown) extending in a direction opposite to the arm 27 from the bearing 21 and a voice coil supported by the support frame. The voice coil is positioned between a pair of yokes 34 fixed onto the base 10a in a state in which the head actuator 14 is incorporated into the base 10a and constitutes the VCM 16 together with these yokes and magnets fixed to the yokes.

By passing a current to the voice coil of the VCM 16 while the magnetic disk 12 is rotating, the head actuator 14 is rotationally moved and the magnetic head 33 is moved and positioned on a desired track of the magnetic disk 12. At this point, the magnetic head 33 is moved between an inner circumferential edge and an outer circumferential edge of the magnetic disk along the radial direction of the magnetic disk 12.

Next, the configuration of the magnetic disk 12 and the magnetic head 33 will be described in detail. FIG. 3 is a sectional view showing the head section 44 of the magnetic head 33 and the magnetic disk 12 as an enlarged view.

As shown in FIGS. 1 to 3, the magnetic disk 12 has a substrate 101 formed in a disc shape of, for example, about 2.5 inches in diameter and made of a non-magnetic substance. A soft magnetic layer 102 made of a material displaying soft magnetic properties as a foundation layer, a magnetic recording layer 103 having magnetic anisotropy in a direction perpendicular to the disk surface as an upper layer thereof, and a protective film layer 104 as an upper layer thereof are stacked in this order on each surface of the substrate 101.

As shown in FIGS. 2 and 3, the magnetic head 33 is configured as a flying head and comprises the slider 42 formed in an approximately parallelopiped shape and the head section 44 provided at the outflow end (trailing end) of the slider. The slider 42 is formed of, for example, a sintered body of alumina and titanium carbide and the head section 44 is formed by stacking thin films.

The slider 42 has a rectangular air bearing surface (ABS) 43 opposite to the surface of the magnetic disk 12. The slider 42 is floated by an air flow C generated by the rotation of the magnetic disk 12 between the disk surface and the air bearing surface 43. The direction of the air flow C matches a rotation direction B of the magnetic disk 12. The slider 42 is arranged in such a way that the longitudinal direction of the air bearing surface 43 approximately matches the direction of the air flow C with respect to the surface of the magnetic disk 12.

The slider 42 has a leading end 42a positioned on an inflow side of the air flow C and a trailing end 42b positioned on an outflow side of the air flow C. A leading step, trailing step, side step, negative pressure cavity (not shown) and the like are formed on the air bearing surface 43 of the slider 42.

As shown in FIG. 3, the head section 44 has a reproduction head 54 and a recording head (magnetic recording head) 58 formed by a thin film process at the trailing end 42b of the slider 42 and is formed as a separate magnetic head.

The reproduction head 54 comprises a magnetic film 55 showing a magneto-resistance effect and shield films 56, 57 arranged on a trailing side and a leading side of the magnetic film 55 to sandwich the magnetic film 55 therebetween. Lower ends of the magnetic film 55 and the shield films 56, 57 are exposed to the air bearing surface 43 of the slider 42.

Figure 5:
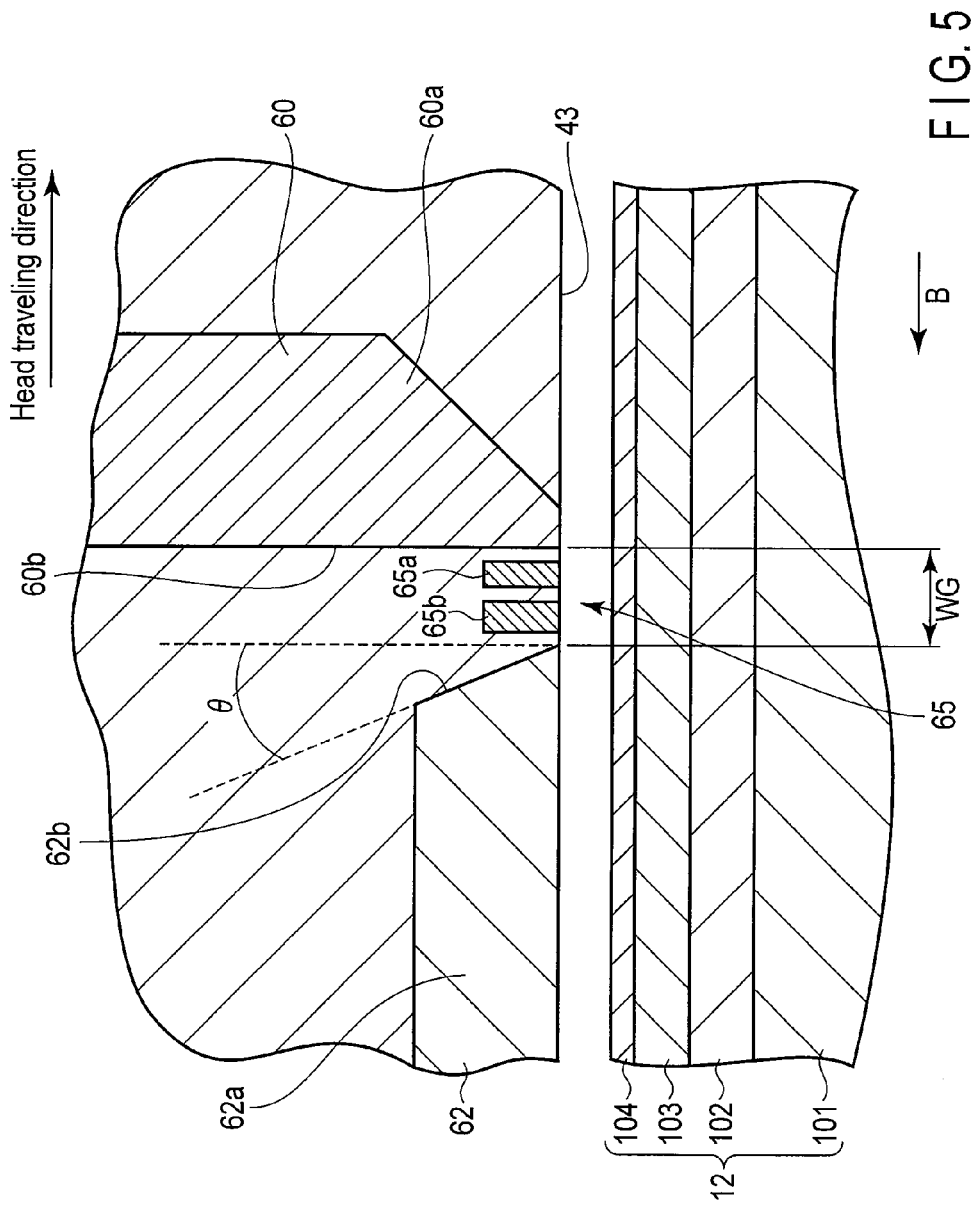
FIG. 5 is a sectional view of an air bearing surface side end of the recording head as an enlarged view.
Figure 6:
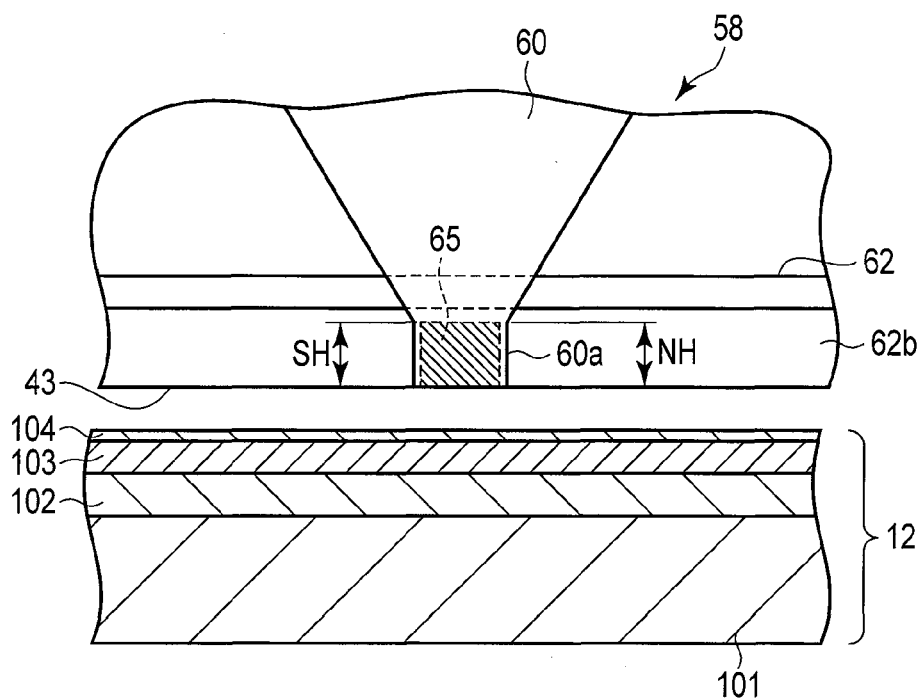
FIG. 6 is a side view when the air bearing surface side end of the recording head is viewed from a reading end side of a slider.
Figure 7:
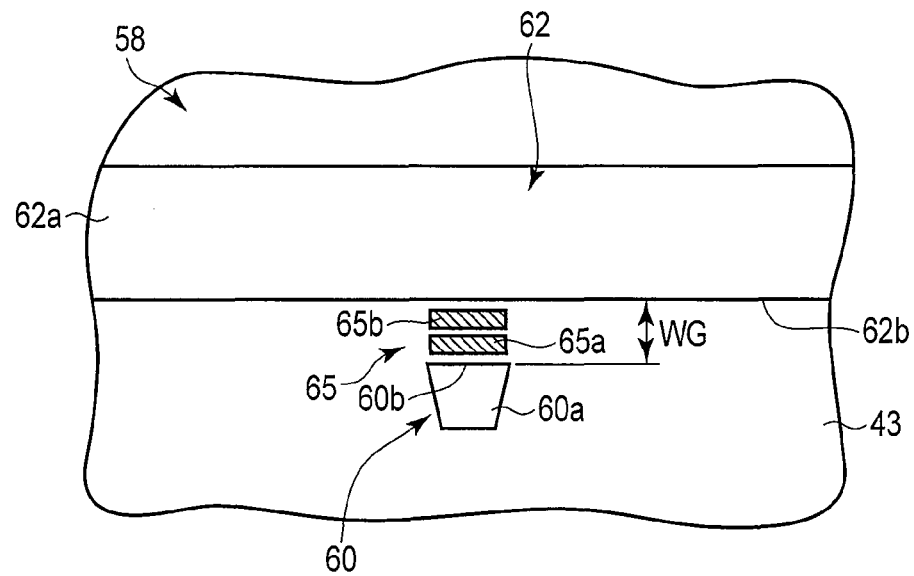
FIG. 7 is a plan view when the recording head is viewed from the air bearing surface side.

The recording head 58 is provided on the side of the trailing end 42b of the slider 42 with respect to the reproduction head 54. FIG. 4 is a perspective view schematically showing the recording head 58 and the magnetic disk 12, FIG. 5 is a sectional view showing a main pole tip portion and a write shield magnetic pole tip portion of the recording head portion as an enlarged view, FIG. 6 is a side view when an air bearing surface end of the recording head is viewed from the leading end side of the slider, and FIG. 7 is a plan view when the recording head portion is viewed from the air bearing surface side.

As shown in FIGS. 3 and 4, the recording head 58 has a main pole 60 made of a soft magnetic material having high magnetic permeability and a high saturation magnetic flux density generating a recording magnetic field in a direction perpendicular to the surface (to the recording layer) of the magnetic disk 12, a write shield magnetic pole (trailing shield magnetic pole) 62 arranged on the trailing side of the main pole 60 with a write gap WG therebetween and made of a soft magnetic material provided to efficiently close a magnetic path via a soft magnetic layer 102 directly below the main pole, a junction 67 physically joining an upper portion of the main pole 60 to the write shield magnetic pole 62, a high-frequency oscillating element, for example, a spin torque oscillator 65 arranged in a portion facing the air bearing surface 43 between a tip portion 60a of the main pole 60 and the write shield magnetic pole 62 and made of a non-magnetic conductive material, and a recording coil 70 arranged so as to wind around a magnetic path including the main pole 60 and the write shield magnetic pole 62 to pass a magnetic flux to the main pole 60 when a signal is written to the magnetic disk 12. The current fed to the recording coil 70 is controlled by the control circuit substrate (control unit) 25 of the HDD.

An electrically insulating layer 61 is arranged at the junction 67 of the main pole 60 and the write shield magnetic pole 62 so that the main pole and the write shield magnetic pole are insulated from each other. The main pole 60 and the write shield magnetic pole 62 are electrically connected to the respective drive terminal electrodes 63. A current circuit is configured so that a current can be passed in series from these drive terminal electrodes 63 through the main pole 60, the spin torque oscillator 65, and the write shield magnetic pole 62. Accordingly, the write shield magnetic pole 62 and the main pole 60 work also as electrodes that perpendicularly pass a current to the spin torque oscillator 65.

The recording coil 70 is wound around the junction 67, for example, between the main pole 60 and the write shield magnetic pole 62. The current fed to the recording coil 70 from a power supply (not shown) is controlled by the control circuit substrate (control unit) 25 of the HDD. When a signal is written to the magnetic disk 12, a predetermined current is fed from the power supply to the recording coil 70 to generate a magnetic field by passing a magnetic flux to the main pole 60.

As shown in FIGS. 3, 4, 6, and 7, the main pole 60 extends almost perpendicularly to the surface of the magnetic disk 12. The tip portion 60a of the main pole 60 on the side of the magnetic disk 12 is narrowed by tapering down toward the air bearing surface 43 and the magnetic disk surface and is formed in a columnar shape narrower than other portions. The tip surface of the main pole 60 is exposed to the air bearing surface 43 of the slider 42. The width of the tip portion 60a of the main pole 60 approximately corresponds to the track width in the magnetic disk 12.

The write shield magnetic pole 62 is formed in an approximately L shape and a tip portion 62a thereof is formed in an elongated rectangular shape. The tip surface of the write shield magnetic pole 62 is exposed to the air bearing surface 43 of the slider 42. The tip portion 62a of the write shield magnetic pole 62 has a leading side end face (magnetic pole end face) 62b opposite to the tip portion 60a of the main pole 60. The leading side end face 62b is sufficiently longer than the width of the tip portion 60a of the main pole 60 and the track width of the magnetic disk 12 and extends along the width direction of the track of the magnetic disk 12. On the air bearing surface 43, the lower end edge or lower end edge portion of the leading side end face 62b is opposite to a trailing side end face 60b of the main pole 60 in parallel with the write gap WG therebetween.

As shown in FIGS. 3, 5, 6, and 7, the spin torque oscillator 65 is arranged between the trailing side end face 60b of the tip portion 60a of the main pole 60 and the leading side end face 62b of the tip portion 62a of the write shield magnetic pole 62 and positioned in the write gap WG.

The spin torque oscillator 65 is configured by stacking a foundation layer, a spin injection layer (second magnetic substance layer) 65a, an intermediate layer, an oscillation layer (first magnetic substance layer) 65b, and a gap layer from the side of the main pole 60 to the side of the write shield magnetic pole 62 in this order. The width of the spin torque oscillator 65 (width in the track width direction) is formed so as to be approximately equal to or slightly smaller than the width of the tip portion 60a of the main pole 60. Then, the spin torque oscillators 65 are provided by being aligned to be opposite to the whole tip portion 60a of the main pole.

The trailing side end face 60b of the tip portion 60a of the main pole 60 extends approximately perpendicularly to the recording layer of the magnetic disk 12 and the air bearing surface 43 of the slider. The spin torque oscillator 65 is arranged opposite to the trailing side end face 60b and in parallel with the trailing side end face 60b. Accordingly, the spin injection layer 65a, the oscillation layer 65b, and other layers of the spin torque oscillator 65 extend approximately perpendicularly to the air bearing surface 43 and the recording layer of the magnetic disk 12. The end of the spin torque oscillator 65 on the side of the air bearing surface 43 is exposed to the air bearing surface 43 and formed in parallel with and flush with the air bearing surface 43.

As shown in FIG. 6, a height SH (height from the air bearing surface 43) of the spin torque oscillator 65 is formed equal to a height NH of the narrowed tip portion 60a of the main pole 60 or smaller than the NH.

The write shield magnetic pole 62 has the leading side end face 62b opposite to the spin torque oscillator 65 and the leading side end face 62b extends by tilting to the head trailing side relative to the direction perpendicular to the recording layer of the magnetic disk 12 and the air bearing surface 43 of the slider with an increasing distance from the recording layer of the magnetic disk 12 (or the air bearing surface 43). That is, the trailing side end face 60b is tilted at an angle (tilt angle) θ toward the head trailing side with respect to the direction perpendicular to the air bearing surface 43 with an increasing distance from the air bearing surface 43 to the depth side in the height direction (in a direction away from the air bearing surface). The angle θ is, for example, 35 degrees. Accordingly, the leading side end face 62b extends tiltingly relative to the main pole 60 and the spin torque oscillator 65 and the interval to the main pole 60 increases with an increasing distance from the air bearing surface 43 to the depth side in the height direction, that is, in a region farther from a region close to the magnetic disk.

The leading side end face 62b is tilted from the position of the air bearing surface 43, but it is only necessary that the leading side end face 62b be tilted toward the trailing side at least from a position lower than the height SH (height from the air bearing surface 43) of the spin torque oscillator 65, that is, a position on the side of the air bearing surface 43 from the upper end of the spin torque oscillator 65. In the present embodiment, the leading side end face 62b as a whole is configured to be tilted, but the present embodiment is not limited to such an example and at least a region in the leading side end face 62b opposite to the spin torque oscillator 65 and wider than the track width may be formed by being tilted at the angle θ.

In the present embodiment, as shown in FIGS. 3 and 4, the tip portion 60a of the main pole 60 has a leading side end face 60c positioned on the opposite side of the trailing side end face 60b and the leading side end face 60c is tilted toward the head leading side with respect to the direction perpendicular to the recording layer of the magnetic disk 12 with an increasing distance from the magnetic disk 12. That is, the leading side end face 60c is tilted toward the head leading side with respect to the direction perpendicular to the air bearing surface 43 with an increasing distance from the air bearing surface 43 to the depth side in the height direction (in a direction away from the air bearing surface).

When a magnetic head is mounted on a magnetic disk drive, the pole length as a length in the head traveling direction on the air bearing surface 43 of the main pole 60 is set to 50 to 100 nm to reduce a fringe magnetic field that degrades adjacent track recording by a skew angle. In addition, it is preferable to increase the thickness on the depth side (the side away from the air bearing surface in the height direction) of the main pole 60 to secure magnetic field intensity that keeps a recording state of the recording layer of the magnetic disk 12 in good condition. Thus, the main pole 60 is preferably configured to be provided with a taper on the head leading side end face 60c so that the thickness of the main pole is narrowed as the air bearing surface 43 is approached.

As shown in FIG. 3, the reproduction head 54 and the recording head 58 are covered with a non-magnetic protective insulating film 81 excluding a portion thereof exposed to the air bearing surface 43 of the slider 42. The protective insulating film 81 constitutes the outside shape of the head section 44.

Figure 8:
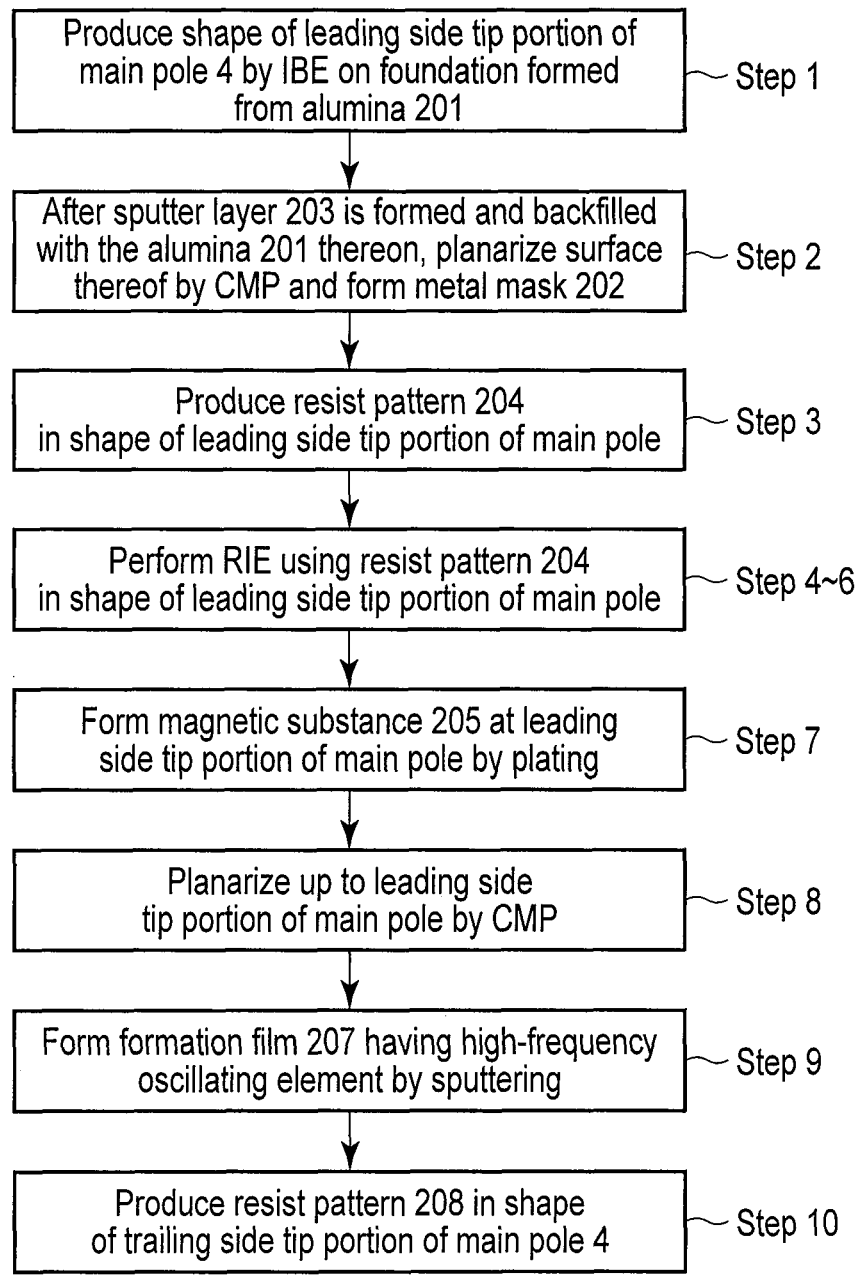
FIG. 8 is a flow chart showing a manufacturing process of the recording head.
Figure 9:
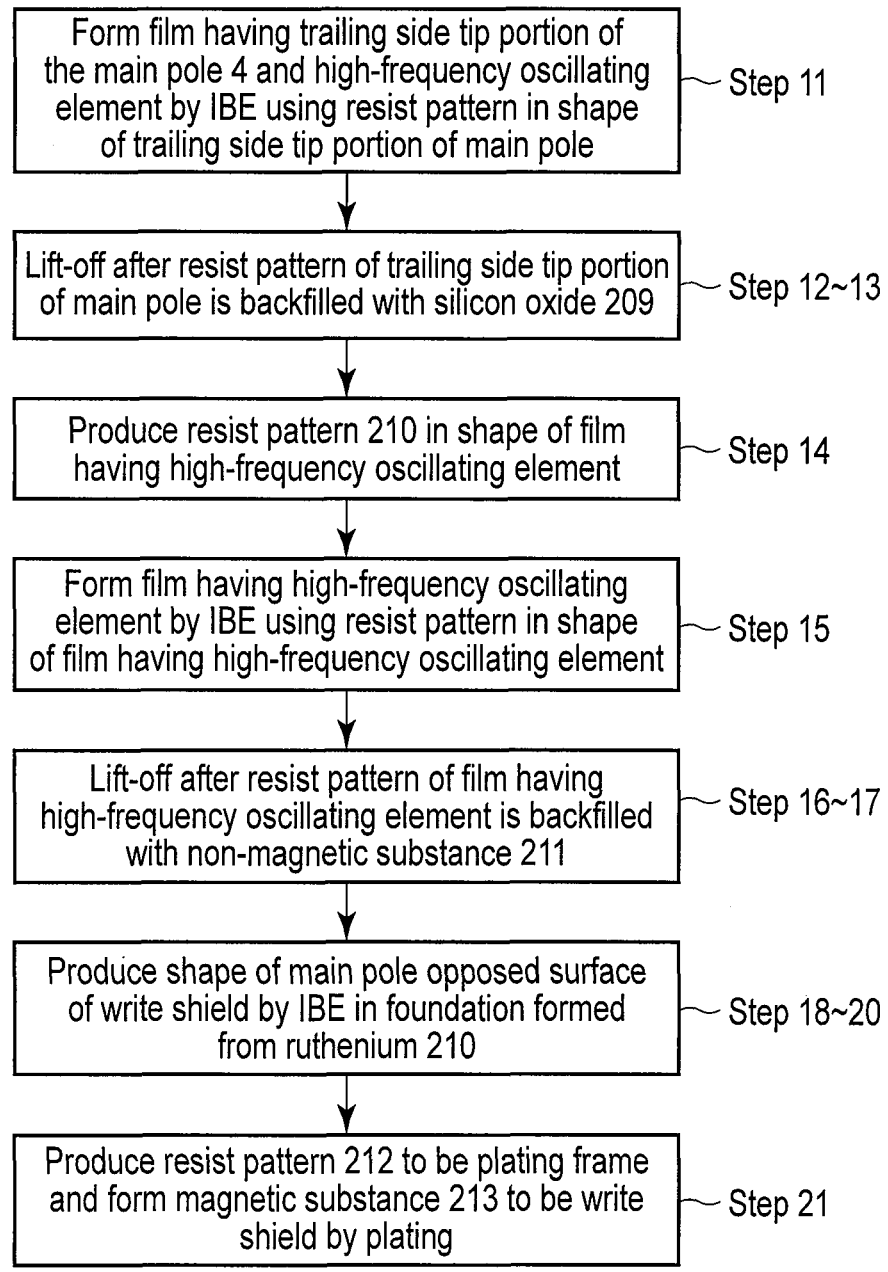
FIG. 9 is a flow chart showing the manufacturing process of the recording head.

The manufacturing process of the recording head 58 configured as described above will be described. FIGS. 8 and 9 show flow charts showing the manufacturing process and FIGS. 10, 11, 12, 13, and 14 show plan views when the recording head in each process is viewed from the air bearing surface side, longitudinal sectional views of the recording head, and side views when the recording head is viewed from the trailing side.

As shown in FIGS. 8, 10(A-1), 10(B-1), and 10(C-1), an alumina film 201 as a foundation is formed and a resist pattern 220 is formed thereon. The alumina film 201 is etched by IBE (ion beam etching) in this state to form the shape of a leading side tip portion of the main pole (step 1).

As shown in FIGS. 10(A-2), 10(B-2), and 10(C-2), after the resist pattern 220 is removed, a sputter layer 203 is formed on the alumina film 201. Further, after being backfilled with the alumina film 201 on the sputter layer 203, the surface thereof is planarized by CMP (chemical mechanical polishing) and a metal mask 202 is formed thereon (step 2).

As shown in FIGS. 10(A-3), 10(B-3), and 10(C-3), a resist pattern 204 in a shape corresponding to the shape of the leading side tip portion of the main pole 60 is formed on the metal mask 202 (step 3). As shown in FIGS. 10(A-4), 10(B-4), and 10(C-4), after the metal mask 202 is etched through the resist pattern 204 by IBE (step 4), as shown in FIGS. 10(A-5), 10(B-5), and 10(C-5), the resist pattern 204 is removed (step 5).

As shown in FIGS. 11(A-6), 11(B-6), and 11(C-6), the alumina film 201 is etched by IBE through the metal mask 202 to form the shape of the leading side tip portion of the main pole 60 (step 6). Subsequently, as shown in FIGS. 11(A-7), 11(B-7), and 11(C-7), after a leading side tip portion region is formed by etching and a magnetic substance layer 205 is formed by plating on the metal mask 202 (step 7), as shown in FIGS. 11(A-8), 11(B-8), and 11(C-8), the magnetic substance layer 205 is planarized by CMP up to the leading side tip portion region (step 8).

As shown in FIGS. 11(A-9), 11(B-9), and 11(C-9), a formation film 207 including a spin injection layer, oscillation layer, intermediate layer, and gap layer is sequentially formed on the magnetic substance layer 205 and the metal mask 202 (step 9).

As shown in FIGS. 12(A-10), 12(B-10), and 12(C-10), a resist pattern 208 in a shape corresponding to the shape of the trailing side tip portion of the main pole 60 is formed on the formation film 207 (step 10). Next, as shown in FIGS. 9, 12(A-11), 12(B-11), and 12(C-11), the formation film 207 is etched from the side of the resist pattern 208 by IBE to form the formation film 207 into a shape corresponding to the trailing side tip portion of the main pole 60 (step 11).

As shown in FIGS. 12(A-12), 12(B-12), and 12(C-12), after a silicon oxide film 209 covering the resist pattern 208 and the alumina film 201 is formed (step 12), as shown in FIGS. 12(A-13), 12(B-13), and 12(C-13), a portion of the resist pattern 208 and the silicon oxide film 209 formed thereon is removed by lift-off (step 13).

Next, as shown in FIGS. 12(A-14), 12(B-14), and 12(C-14), a resist pattern 210 is formed in a portion corresponding to the formation position of the spin torque oscillator on the formation film 207 with a width corresponding to the height of the spin torque oscillator (step 14). As shown in FIGS. 13(A-15), 13(B-15), and 13(C-15), the formation film 207 and the silicon oxide film 209 are etched by IBE through the resist pattern 210 to remove a portion laid on top of the main pole (step 15).

As shown in FIGS. 13(A-16), 13(B-16), and 13(C-16), after being backfilled with a non-magnetic substance layer 211 on the resist pattern 210 (step 16), next as shown in FIGS. 13(A-17), 13(B-17), and 13(C-17), a portion of the resist pattern 210 and the non-magnetic substance layer 211 positioned on the resist pattern 210 is lifted off (step 17).

As shown in FIGS. 14(A-18), 14(B-18), and 14(C-18), after ruthenium 212 is formed as a film on the formation film 207 and the non-magnetic substance layer 211 (step 18), as shown in FIGS. 14(A-19), 14(B-19), and 14(C-19), a resist pattern 213 is formed on an edge on the opposite side of the ABS surface of the ruthenium 212 (step 19). In this state, as shown in FIGS. 14(A-20), 14(B-20), and 14(C-20), the ruthenium 212 is obliquely etched by IBE to form the shape of the leading side end face of a write shield magnetic pole (step 20).

Then, as shown in FIGS. 14(A-21), 14(B-21), and 14(C-21), a resist pattern 214 to be a plating frame is formed and further a magnetic substance 215 constituting a write shield is formed on the formation film 207 and the non-magnetic substance layer 211 by plating (step 21). Then, the main pole, spin torque oscillator, and write shield magnetic pole are planarized up to the air bearing surface by CMP. The main pole 60, the spin torque oscillator 65, and the write shield magnetic pole 62 having the above configuration are formed by the above process.

According to the HDD configured as described above, the head actuator 14 is rotationally moved and the magnetic head 33 is moved to a desired track of the magnetic disk 12 and positioned by driving the VCM 16. The magnetic head 33 is floated by the air flow C generated by the rotation of the magnetic disk 12 between the disk surface and the air bearing surface 43. When the HDD operates, the air bearing surface 43 of the slider 42 is opposed to the disk surface with a gap therebetween. As shown in FIG. 2, the magnetic head 33 is floated in an inclined posture in which the portion of the recording head 58 of the head section 44 is the closest to the surface of the magnetic disk 12. In this state, the reproduction head 54 reads recorded information from the magnetic disk 12 and also the recording head 58 writes information to the magnetic disk 12.

When information is written, the main pole 60 is magnetized by the recording coil 70 and a recording magnetic field in the direction perpendicular to the disk surface is applied to the magnetic recording layer 103 of the magnetic disk 12 just below the main pole to record information in a desired track width.

Figure 15:
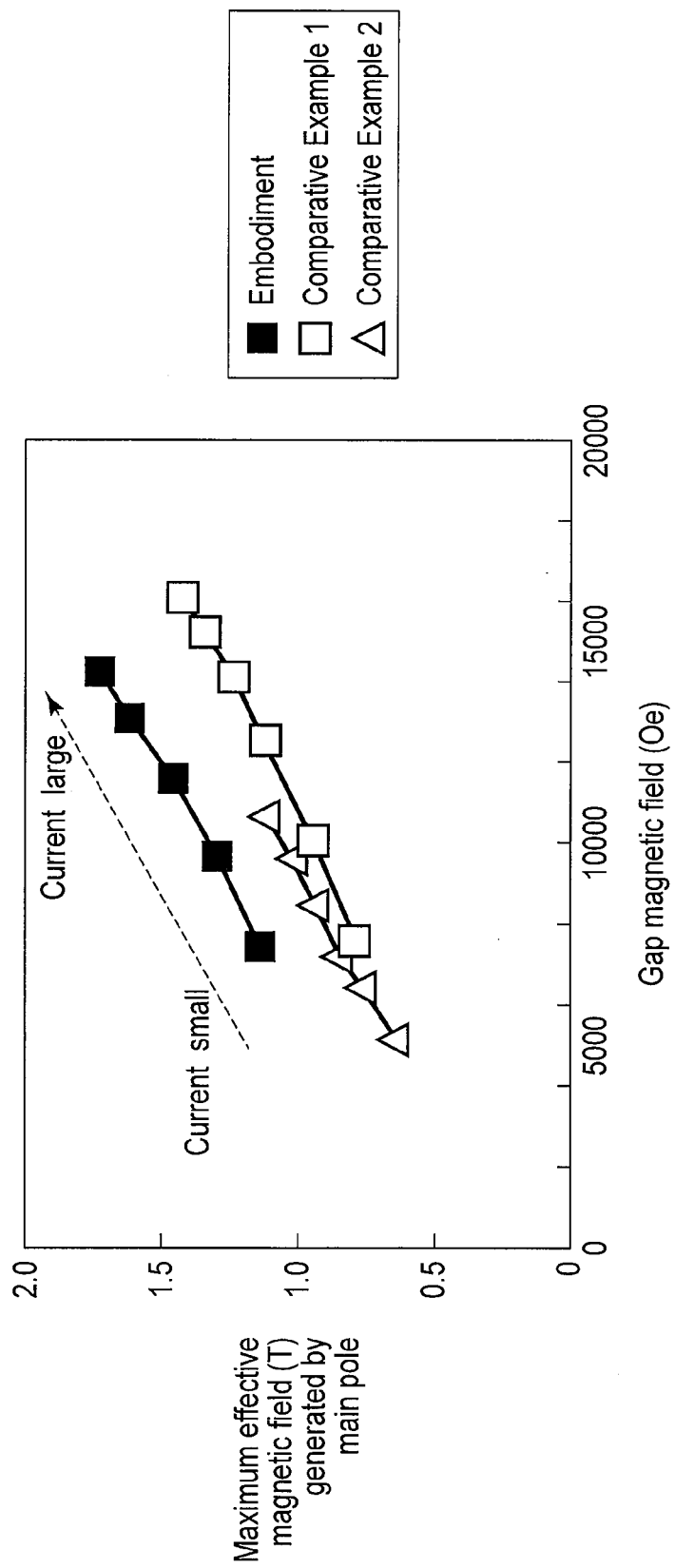
FIG. 15 is a diagram showing relationships between a gap magnetic field applied to a spin torque oscillator and a maximum effective magnetic field generated by a main pole for comparison for magnetic recording heads according to Comparative Examples 1, 2 and the present embodiment.
Figure 16B:
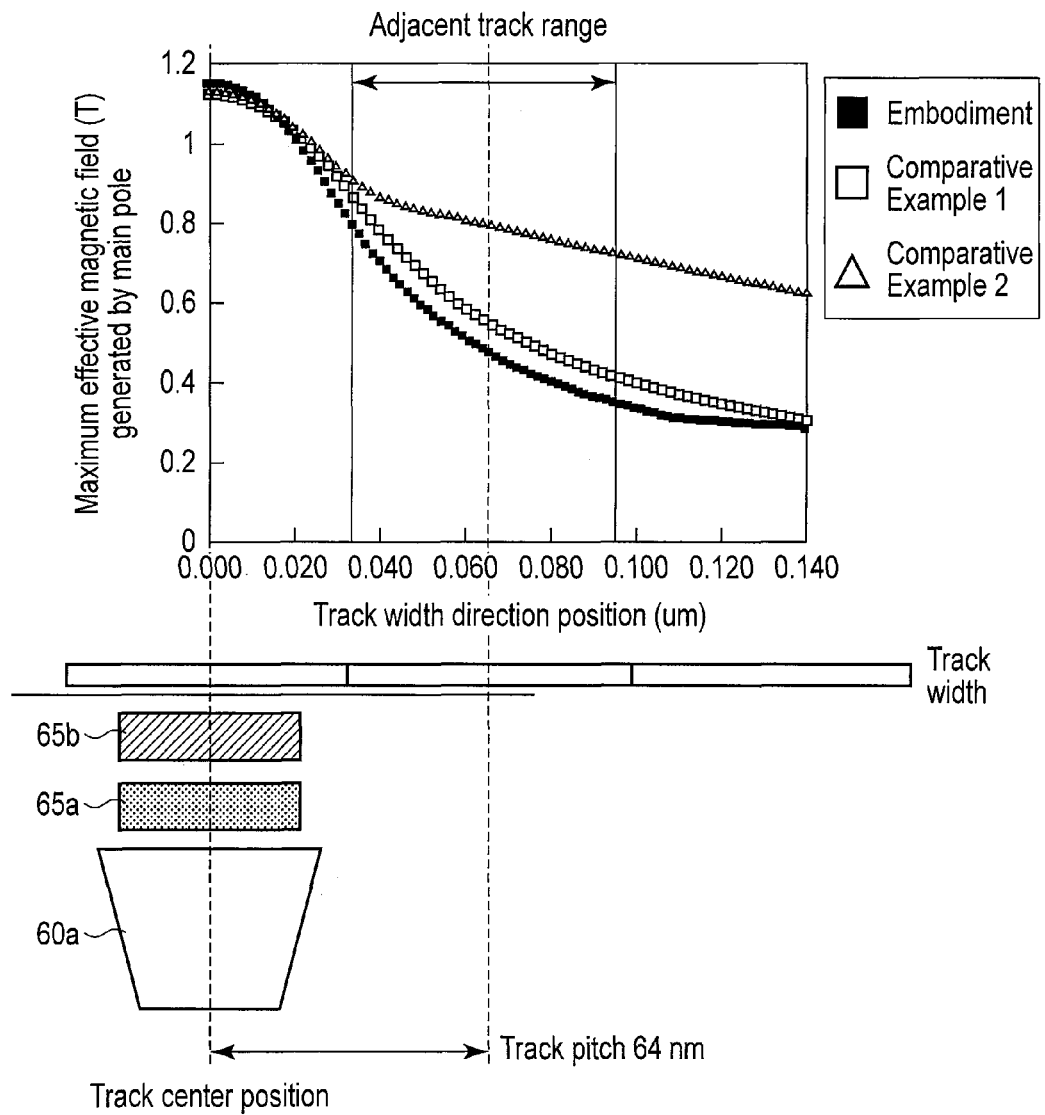
FIG. 16B is a diagram showing the maximum effective magnetic field plotted with respect to the track width when the coil current is 20 mA in the magnetic recording head in the present embodiment, 40 mA in the magnetic recording head in Comparative Example 1, and 120 mA in the magnetic recording head in Comparative Example 2 so that the maximum effective magnetic fields generated by the main pole become equal for the magnetic recording heads according to the present embodiment and Comparative Examples 1, 2.

FIGS. 15, 16A, and 16B show properties of the magnetic recording head 58 according to the present embodiment described above and properties of magnetic recording heads according to Comparative Examples 1, 2 for comparison. The magnetic recording head according to Comparative Example 1 has a spin torque oscillator and is a recording head in which the main pole and an opposed surface (leading side end face) of the write shield magnetic pole are parallel to each other. The magnetic recording head according to Comparative Example 2 has a spin torque oscillator and is a recording head in which the trailing side end face of the main pole opposite to an opposed surface (leading side end face) of the write shield magnetic pole is tilted toward the leading side with respect to the direction perpendicular to the air bearing surface.

FIG. 15 shows relationships between a gap magnetic field applied to the spin torque oscillator and the maximum effective magnetic field generated by the main pole for comparison for the magnetic recording heads according to Comparative Examples 1, 2 and the present embodiment. In the above example, no current is passed to the spin torque oscillator by the drive terminal electrodes 63.

Regarding the magnetic recording head (indicated by plots of ■) according to the present embodiment, the magnetic recording head (indicated by plots of □) according to Comparative Example 1, and the magnetic recording head (indicated by plots of △) according to Comparative Example 2, relationships between the gap magnetic field and the maximum effective magnetic field generated by the main pole are shown when the current passed to the recording coil 70 is changed among five points of 20, 40, 60, 80, 100 mA in the present embodiment, six points 10, 20, 40, 60, 80, 100 mA in Comparative Example 1, and six points 20, 40, 60, 80, 100, 120 mA in Comparative Example 2. The ranges of current are different because the current in comparative Example 2 is made larger to match recording capacities described with reference to FIG. 18. Also, the current applied to Comparative Example 1 is made smaller to match gap magnetic fields described with reference to FIG. 19.

It is clear from FIG. 15 that when compared with the relationship between the gap magnetic field and the maximum effective magnetic field in Comparative Example 1, the relationship of the magnetic recording head in the present embodiment is shifted in a direction in which the gap magnetic field becomes smaller with respect to the maximum effective magnetic field. For example, while the maximum effective magnetic field is 1.12 T and the gap magnetic field is 12500 (Oe) at 40 mA in Comparative Example 1 and the maximum effective magnetic field is 1.12 T and the gap magnetic field is 10700 (Oe) at 120 mA in Comparative Example 2, the maximum effective magnetic field is 1.15 T and the gap magnetic field is 7400 (Oe) at 20 mA in the present embodiment, which means that the gap magnetic field is reduced by about 5000 (Oe) with respect to the maximum effective magnetic field. That is, it is clear that the magnetic recording head according to the present embodiment can significantly mitigate the gap magnetic field.

The gap magnetic field decreases in the magnetic recording head according to Comparative Example 2, but the maximum effective magnetic field is significantly degraded at the same time and thus, the relationship between the gap magnetic field and the maximum effective magnetic field hardly changes from the relationship between the gap magnetic field and the maximum effective magnetic field in Comparative Example 1.

FIG. 16A shows relationships between a fringe magnetic field defined with reference to FIG. 16B and the maximum effective magnetic field generated by the main pole for comparison for the magnetic recording heads according to the present embodiment and Comparative Examples 1, 2. In the above example, no current is passed to the spin torque oscillator by the drive terminal electrodes 63.

In the present embodiment, the maximum effective magnetic field generated by the main pole is plotted with respect to the track width direction. The magnetic field obtained by averaging the maximum effective magnetic field in the range of the adjacent track position 32 to 96 nm when the recording track pitch is 64 nm and, as shown in FIG. 16B, the track center position is set as 0 nm is calculated as a fringe magnetic field and used as an index of the magnetic field affecting adjacent tracks.

In FIGS. 16A and 16B, regarding the magnetic recording head (indicated by plots of ■) according to the present embodiment, the magnetic recording head (indicated by plots of □) according to Comparative Example 1, and the magnetic recording head (indicated by plots of Δ) according to Comparative Example 2, relationships between the fringe magnetic field and the maximum effective magnetic field generated by the main pole are shown when the current passed to the recording coil 70 is changed among five points of 20, 40, 60, 80, 100 mA in the present embodiment, six points 10, 20, 40, 60, 80, 100 mA in Comparative Example 1, and six points 20, 40, 60, 80, 100, 120 mA in Comparative Example 2.

From these figures, it is clear that when compared with the relationship between the fringe magnetic field and the maximum effective magnetic field in Comparative Example 1, the relationship of the magnetic recording head in the present embodiment is shifted in a direction in which the fringe magnetic field becomes smaller with respect to the maximum effective magnetic field. In the magnetic recording head according to the present embodiment, the magnetic coupling between the main pole and write shield magnetic pole is weakened and thus, the magnetic flux is efficiently concentrated on the magnetic pole tip. Accordingly, the influence of the fringe magnetic field is mitigated with respect to the maximum effective magnetic field generated by the main pole.

When compared with the magnetic recording heads according to the present embodiment and Comparative example 1, the relationship of the magnetic recording head according to Comparative Example 2 is shifted in a direction in which the fringe magnetic field becomes larger with respect to the maximum effective magnetic field generated by the main pole. With the main pole tilted toward the head leading side, the flow of magnetic flux of the main pole is headed toward the head leading side and thus, the amount of magnetic flux flowing to the main pole tip decreases. Further, it is clear that the fringe magnetic field increases due to a leakage magnetic field from the head leading side.

In FIG. 16B, the maximum effective magnetic field is plotted with respect to the track width when the coil current is 20 mA in the magnetic recording head in the present embodiment, 40 mA in the magnetic recording head in Comparative Example 1, and 120 mA in the magnetic recording head in Comparative Example 2 so that the maximum effective magnetic fields generated by the main pole become equal for the three magnetic recording heads. ■ is plotted for the present embodiment, □ for Comparative Example 1, and Δ for Comparative Example 2. It is also clear by viewing the profile shown in FIG. 16B that when compared with Comparative Examples 1, 2, the spread of the maximum effective magnetic field in the track width direction of the magnetic recording head according to the present embodiment is inhibited.

From FIGS. 15, 16A, and 16B, it is clear that instead of tilting the main pole opposed surface opposite to the write shield magnetic pole toward the leading side like Comparative Example 2, the present embodiment in which the opposed surface (leading side end face, magnetic pole end face) of the write shield magnetic pole opposite to the main pole is tilted toward the trailing side is effective to mitigate the gap magnetic field applied to a recording medium while the maximum effective magnetic field generated by the main pole is maintained.

Figure 17:
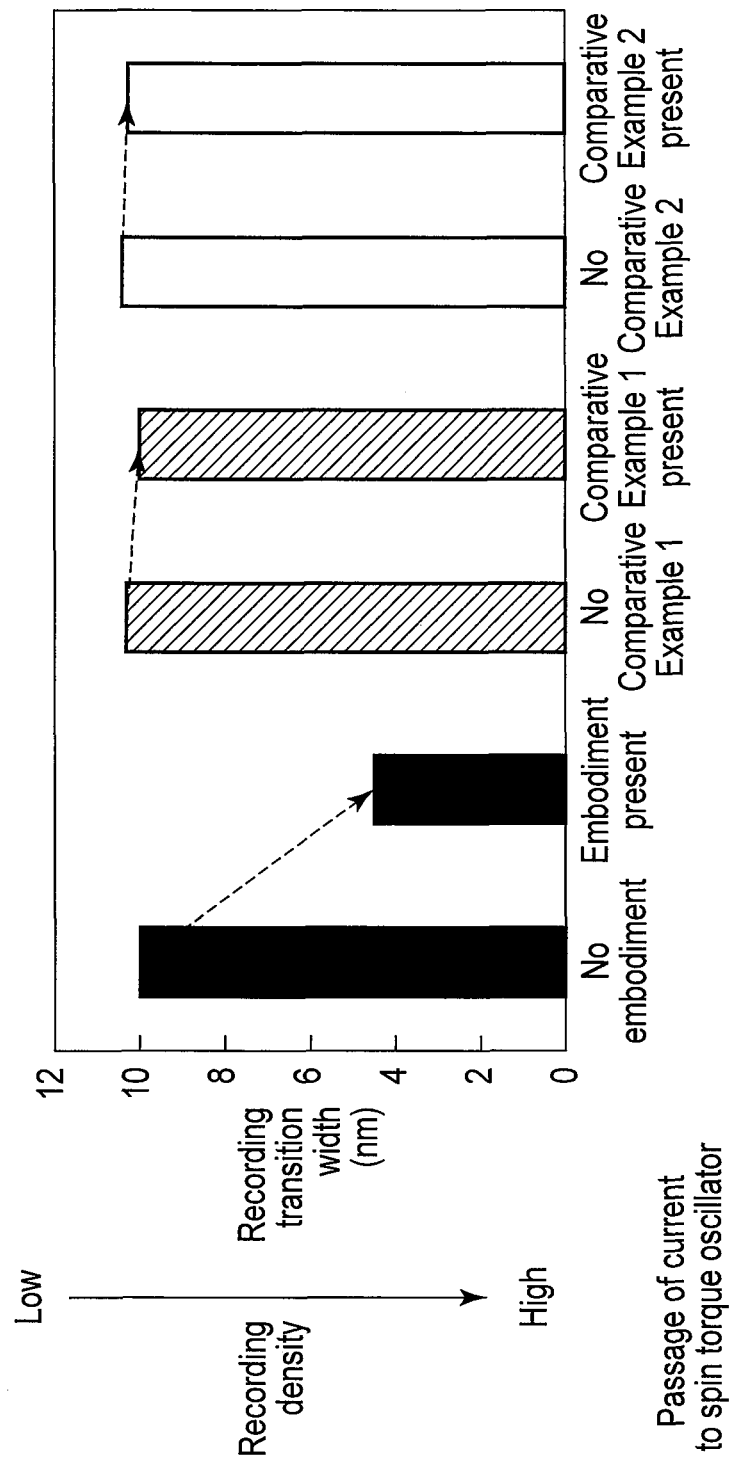
FIG. 17 is a diagram showing results of calculating a magnetic transition width of a recording pattern written to a magnetic disk while a current is passed to the spin torque oscillator by drive terminal electrodes 63 for each of the present embodiment, Comparative Examples 1, 2.

FIG. 17 shows results of calculating a magnetic transition width of a recording pattern written to the magnetic disk while a current is passed to the spin torque oscillator by the drive terminal electrodes 63 for each of the present embodiment, Comparative Example 1, and Comparative Example 2. As the magnetic transition width becomes narrower, the recording density can be improved because an influence of bit shifts or waveform interference on adjacent bits can be reduced even if the bit interval is shortened.

Records are made while the coil current of 20 mA is passed in the magnetic recording head in the present embodiment, the coil current of 40 mA is passed in Comparative Example 1, and the coil current of 120 mA is passed in Comparative Example 2 so that recording capacities when no current is passed to the spin torque oscillator become equal. An anisotropic magnetic field Hk of the recording layer where a record is made is set to 16 kOe.

In Comparative Example 1, the magnetic transition width when a current is passed to the spin torque oscillator is 10 nm while the magnetic transition width when no current is passed to the spin torque oscillator is 10.2 nm, obtaining an improvement of only 0.2 nm. In Comparative Example 2, the magnetic transition width when a current is passed to the spin torque oscillator is 10.2 nm while the magnetic transition width when no current is passed to the spin torque oscillator is 10.4 nm, obtaining an improvement of only 0.2 nm also in this case. In the magnetic recording head according to the present embodiment, on the other hand, the magnetic transition width when a current is passed to the spin torque oscillator is 4.5 nm while the magnetic transition width when no current is passed to the spin torque oscillator is 10 nm, producing a significant improvement of 5.5 nm. From the above, it is clear that the magnetic recording head according to the present embodiment can improve the recording density by oscillation of a spin torque device.

Figure 18:
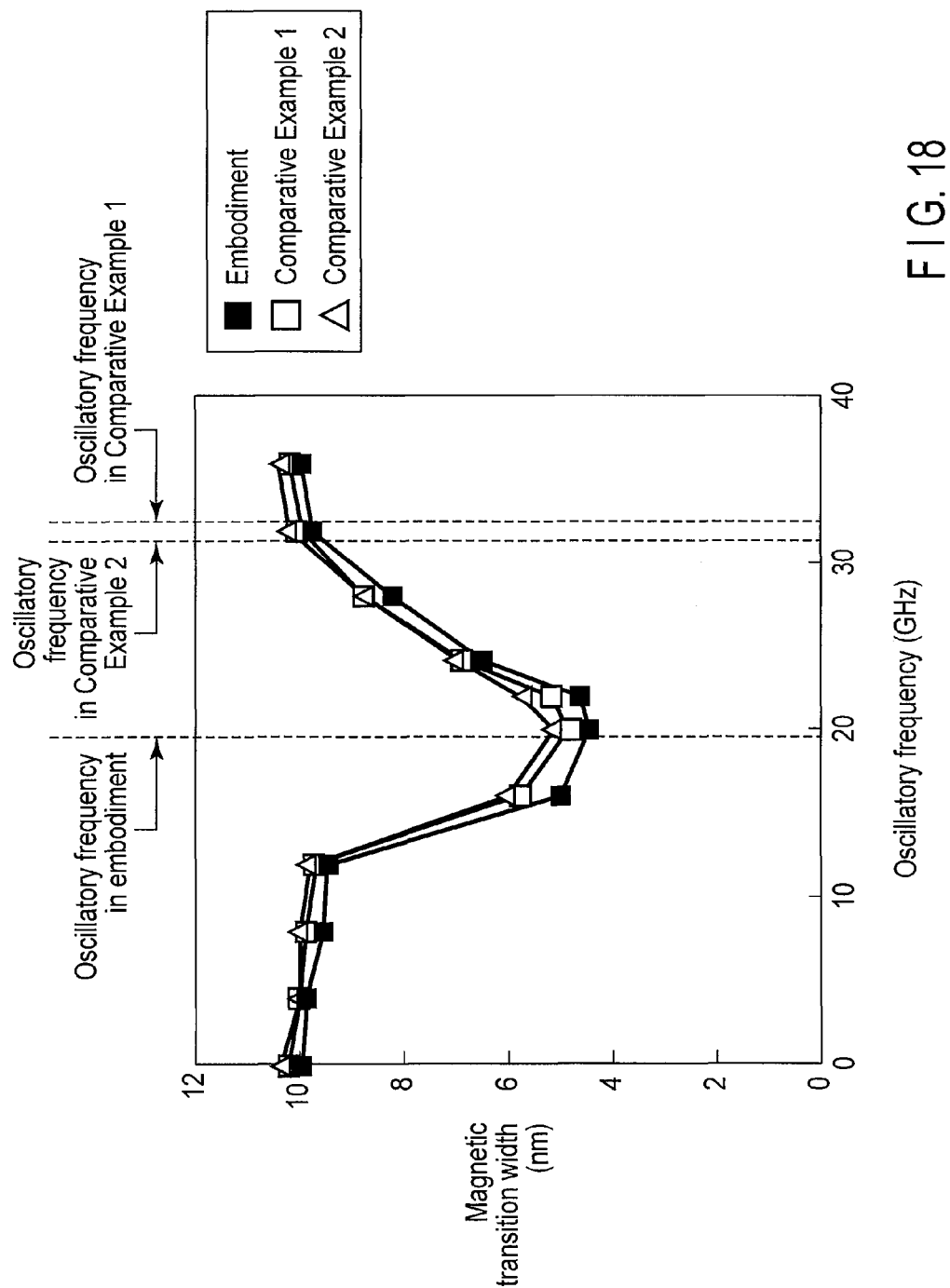
FIG. 18 is a diagram showing a result of calculating changes of the magnetic transition width of the recording pattern written to the magnetic disk when an oscillatory frequency of the spin torque oscillator is changed in the range of 0 to 36 GHz.
Figure 19:
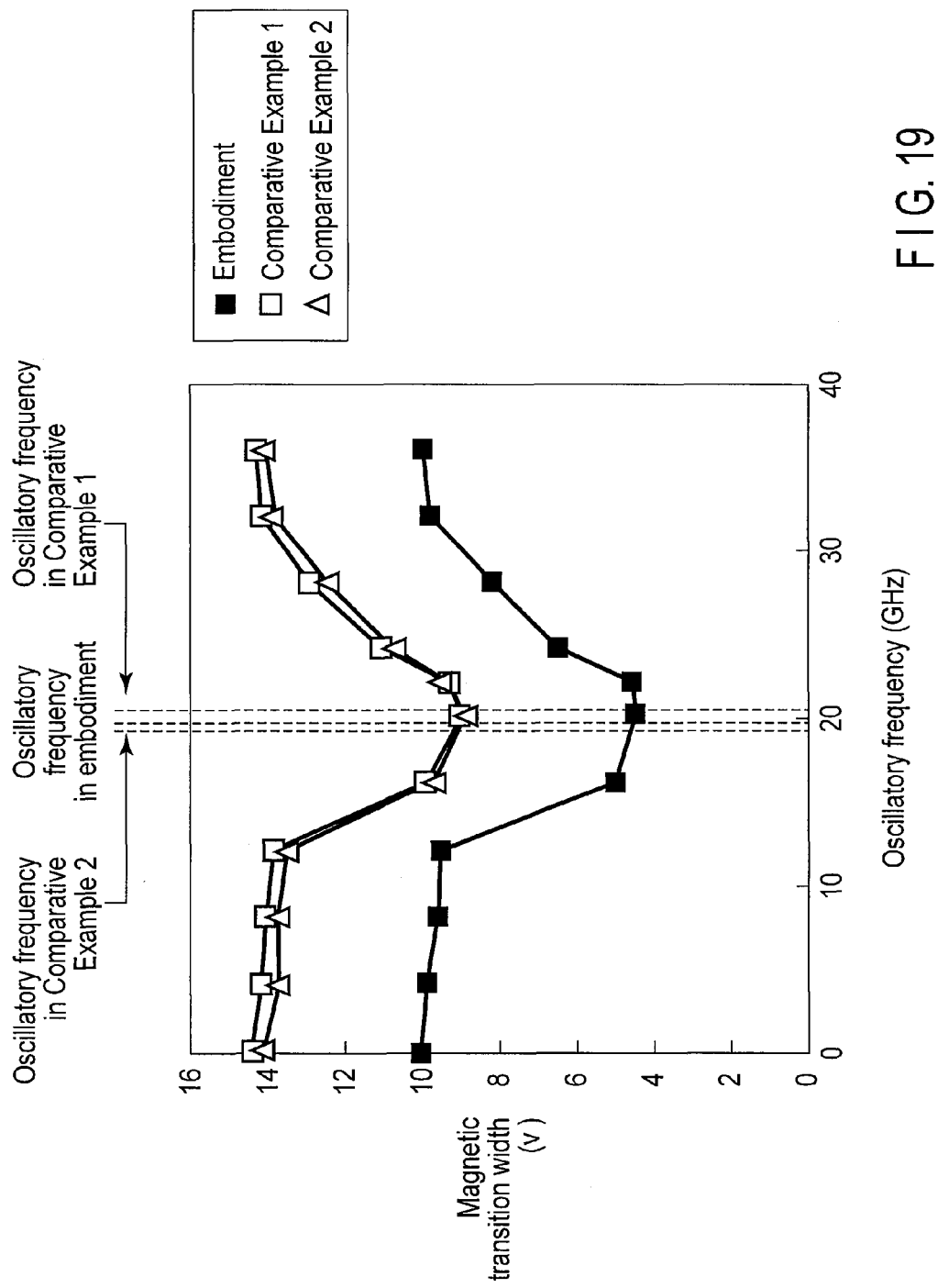
FIG. 19 is a diagram showing a result of calculating the magnetic transition width of the recording pattern written to the magnetic disk when the oscillatory frequency of the spin torque oscillator is changed in the range of 0 to 36 GHz.

FIGS. 18 and 19 show relationships between the oscillatory frequency and the magnetic transition width describing the above calculation results shown in FIG. 17. FIG. 18 shows a result of calculating changes of the magnetic transition width of a recording pattern written to a magnetic disk when the oscillatory frequency of a spin torque oscillator is changed in the range of 0 to 36 GHz. Records are made while the coil current of 20 mA is passed in the present embodiment, 40 mA in Comparative Example 1, and 120 mA in Comparative Example 2 so that recording capacities when no current is passed to the spin torque oscillator become equal. ■ is plotted for calculated values in the present embodiment, □ in Comparative Example 1, and Δ in Comparative Example 2.

As shown in FIG. 18, the magnetic recording head according to the present embodiment and the magnetic recording heads according to Comparative Examples 1, 2 take the minimum value of the recording magnetic transition width when the oscillatory frequency is 20 GHz, which corresponds to the frequency (=medium resonance frequency) at which perpendicular magnetization of the recording layer of a recording medium can be inverted most easily. In the magnetic recording heads in Comparative Example 1 in which the gap magnetic field is 12500 (Oe) and the magnetic recording head in Comparative Example 2 in which the gap magnetic field is 10700 (Oe), however, the respective oscillatory frequency of the recording medium shows 30 GHz or more, which significantly deviates from the resonance frequency of the recording medium. It is clear that the magnetic transition width is not improved in the above range of the oscillatory frequency. In the magnetic recording head in the present embodiment in which the gap magnetic field is 7400 (Oe), on the other hand, the oscillatory frequency of the spin torque oscillator shows 20 GHz, which matches the oscillatory frequency of the medium, and thus, the magnetic transition width is improved most significantly.

FIG. 19 shows a result of calculating the magnetic transition width of the recording pattern written to the magnetic disk when the oscillatory frequency of the spin torque oscillator is changed in the range of 0 to 36 GHz. The difference from FIG. 18 is that records are made while the coil current of 20 mA is passed in the present embodiment, the coil current of 10 mA is passed in Comparative Example 1, and the coil current of 60 mA is passed in Comparative Example 2 so that the gap magnetic fields applied to the spin torque oscillator become equal. ■ is plotted for calculated values in the present embodiment, □ in Comparative Example 1, and Δ in Comparative Example 2.

In the magnetic recording head according to the present embodiment and the magnetic recording heads according to Comparative Examples 1, 2, the gap magnetic field is about 7500 (Oe) and the oscillatory frequency of the spin torque oscillator is 20 GHz. However, the magnetic recording heads of Comparative Examples 1, 2 whose maximum effective magnetic field generated by the main pole is about 0.8 T is significantly degraded in recording capacity when no current is passed to the spin torque oscillator. Thus, even if the magnetic transition width is improved by passing a current, the magnetic transition width is 9 nm and a higher density cannot be achieved.

From the above result, it is clear that a magnetic recording head according to the present embodiment including a spin torque oscillator can match the oscillatory frequency of the spin torque oscillator and the medium resonance frequency while maintaining the maximum effective magnetic field generated by the main pole and a gradient and thus is effective in achieving a higher recording density.

In the magnetic recording head 58 according to the present embodiment, the tilt angle θ of the leading side end face (magnetic pole end face) 62b of the write shield magnetic pole 62 is preferably 10°≤θ≤60°. FIG. 20 shows the relationship among the tilt angle θ, the gap magnetic field, and the oscillatory frequency of the spin torque oscillator. Like the above condition in FIG. 18, the coil current is adjusted so that recording capacities when no current is passed to the spin torque oscillator become equal. It is clear from FIG. 20 that with an increasing tilt angle θ, the gap magnetic field decreases and the oscillatory frequency of the spin torque oscillator also decreases correspondingly.

As described with reference to FIG. 18, the magnetic transition width is not improved if the oscillatory frequency of the spin torque oscillator significantly deviates from the medium resonance frequency. As shown in FIG. 20, if the tilt angle θ>60°, the oscillatory frequency is smaller than 16 GHz and if the tilt angle θ<10°, the oscillatory frequency is larger than 28 GHz. Thus, if the tilt angle θ is in the above range, it is clear from FIG. 18 that the magnetic transition width is not improved. Therefore, a higher recording density can be achieved by setting the tilt angle θ of the leading side end face (magnetic pole end face) 62b of the write shield magnetic pole 62 to, like the present embodiment, 10°≤θ≤60°.

Also, as shown in FIG. 6, the relationship between the height SH of the spin torque oscillator 65 from the air bearing surface 43 and the height NH of the main pole 60 from the air bearing surface 43 to the tip narrowed portion thereof is preferably NH≥SH. The main pole 60 and the spin torque oscillator 65 are trimmed at the same time in a processing process of the track width definition of the main pole 60 and the spin torque oscillator 65 and thus, if NH<SH, a square shape is formed at the upper left and right of the spin torque oscillator 65. The square shape could cause pinning of magnetization in magnetization rotation of the spin torque oscillator 65, inhibiting oscillation. Regarding presence/absence of oscillation, a method of measuring the rise in resistance by utilizing the magneto-resistance effect in which the electric resistance changes depending on an external magnetic field is known.

Figure 21:
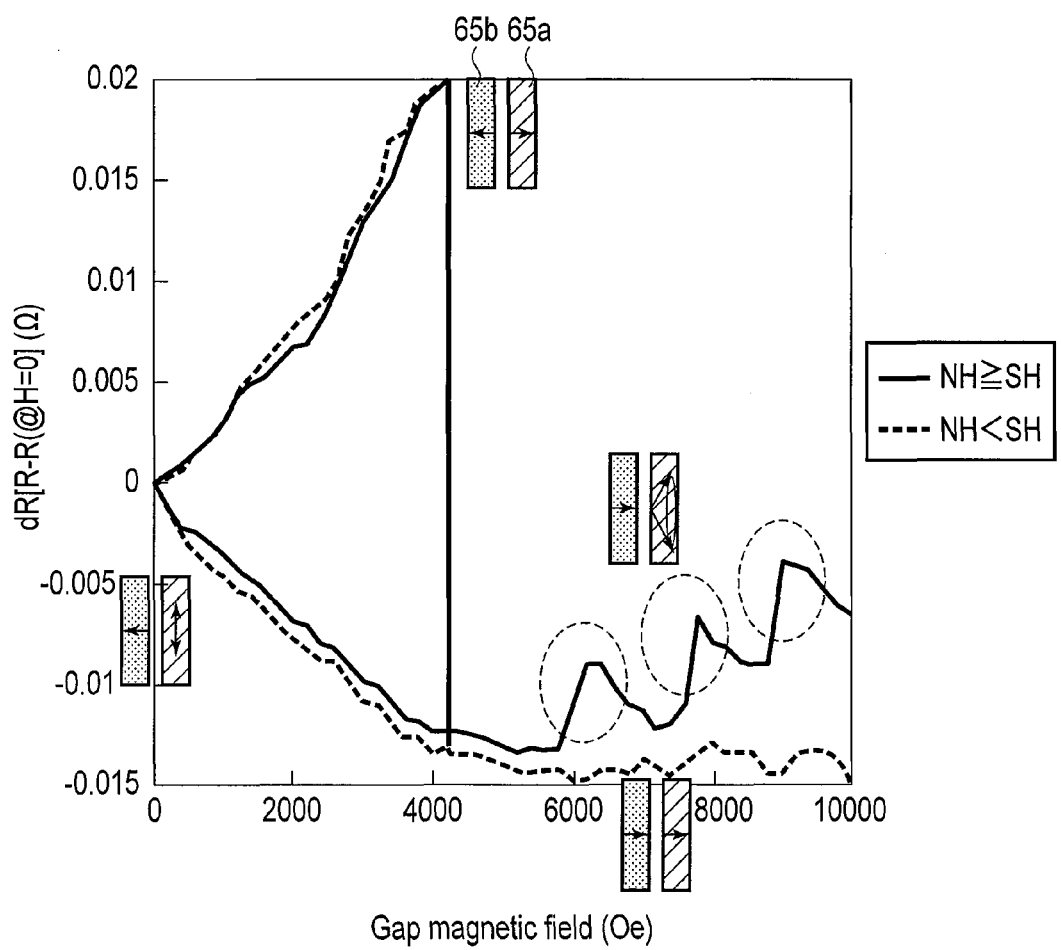
FIG. 21 is a diagram showing changes of the electric resistance of the spin torque oscillator with respect to the gap magnetic field.

FIG. 21 shows changes of the electric resistance of the spin torque oscillator 65 (the spin injection layer 65a, the oscillation layer 65b) with respect to the gap magnetic field. FIG. 21 is a diagram in which changes of resistance are plotted after measuring the electric resistance when the magnitude of the gap magnetic field applied to the spin torque oscillator 65 is changed while a current is passed to the spin torque oscillator perpendicularly by the drive terminal electrodes 63 and setting the resistance when the gap magnetic field=0 as dR=0 (reference value).

The orientation of the gap magnetic field applied to the spin torque oscillator 65 is an orientation of inflow from the main pole 60 to the write shield magnetic pole 62. When the gap magnetic field=0, the oscillation layer 65b of the spin torque oscillator 65 working as a free layer is magnetized in a film surface direction, but if the gap magnetic field is applied, the oscillation layer 65b is magnetized in the same direction as that of the gap magnetic field. On the other hand, the spin injection layer 65a working as a pin layer is not inverted until the gap magnetic field=4000 (Oe) and thus, the magnetization of the oscillation layer 65b and that of the spin injection layer 65a become anti-parallel and the resistance increases.

If the gap magnetic field larger than 4000 (Oe) is applied, the magnetization of the spin injection layer 65a is also inverted and thus, the magnetization of the oscillation layer 65b and that of the spin injection layer 65a become parallel and the resistance decreases. If the gap magnetic field is further applied, a spin injection force applied to the film surface of the oscillation layer 65b and the gap magnetic field are balanced, causing the rotation of magnetization in the spin torque oscillator. At this point, the magnetization of the oscillation layer 65b and that of the spin injection layer 65a are approximately perpendicular to each other and the resistance increases.

When NH≥SH, as indicated by a broken line round frame in FIG. 21, an increase in resistance is confirmed in the range of the gap magnetic field >6000 (Oe), showing that oscillation has occurred. When NH<SH, on the other hand, no change in resistance is observed even if the gap magnetic field is increased while the resistance is decreased at the gap magnetic field=4000 (Oe), showing that no oscillation has occurred.

From the above result, the magnetic recording head 58 according to the present embodiment can cause the spin torque oscillator 65 to oscillate with stability by setting NH≥SH and thus, the quality of signals recorded in the recording medium is improved so that a higher recording density can be achieved.

As described above, a magnetic recording head including a spin torque oscillator used in a magnetic disk drive according to the present embodiment is configured to be formed so as to move away from the main pole, that is, in such a way that the distance from the main pole increases as the magnetic pole end face of a write shield magnetic pole opposite to the spin torque oscillator moves from the air bearing surface of a slider toward the depth side in the height direction and due to this configuration, the frequency of a high-frequency magnetic field (Hac) generated by the spin torque oscillator can be matched to the resonance frequency of a recording medium by mitigating the magnitude of the magnetic field (=gap magnetic field) applied to the spin torque oscillator so that perpendicular magnetization of the recording layer of the recording medium can be made to be inverted more easily. As a result of increased inversion capacity of medium magnetization recorded in the recording medium in the magnetic disk drive, signal intensity is increased and also signal degradation of recorded signals can be inhibited. Accordingly, the quality of signals recorded and stored on the magnetic disk is improved and as a result, the recording density can be improved and also signal reliability is improved. From the above, the quality of signals recorded on the magnetic disk is improved so that a magnetic recording head enabling a higher recording density and a disk drive including such a magnetic recording head can be obtained.

In the first embodiment, the leading side end face 62b of the write shield magnetic pole 62 is configured to be linearly inclined, but like a magnetic recording head according to the first modification shown in FIG. 22, the leading side end face 62b may be formed stepwise so as to move away from the spin torque oscillator 65 and the trailing side end face 60b of the main pole 60 when moving from the air bearing surface 43 of the slider toward the depth side in the height direction. In this case, the leading side end face 62b is formed in such a way that the overall average inclination becomes the angle θ.

Figure 23:
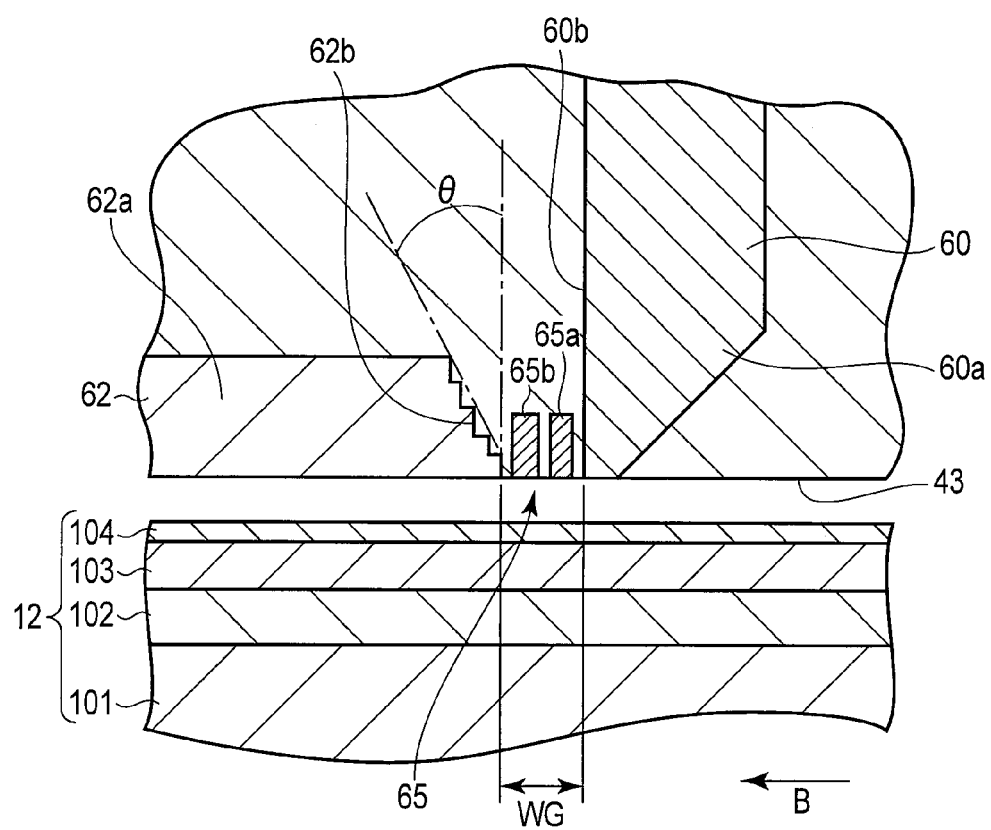
FIG. 23 is a sectional view showing the tip portion of a magnetic recording head according to a second modification.

Also, like a magnetic recording head according to the second modification shown in FIG. 23, the leading side end face 62b may be formed in a curved arc shape so as to move away from the spin torque oscillator 65 and the trailing side end face 60b of the main pole 60 when moving from the air bearing surface 43 of the slider toward the depth side in the height direction. In this case, the leading side end face 62b is formed in such a way that the overall average inclination becomes the angle θ.

Next, HDDs and magnetic heads according to other embodiments will be described. In various embodiments described below, the same reference numerals as those in the first embodiment are attached to the same units as those in the first embodiment and a detailed description thereof is omitted.

Second Embodiment

Next, a recording head of an HDD according to the second embodiment will be described.

Figure 25:
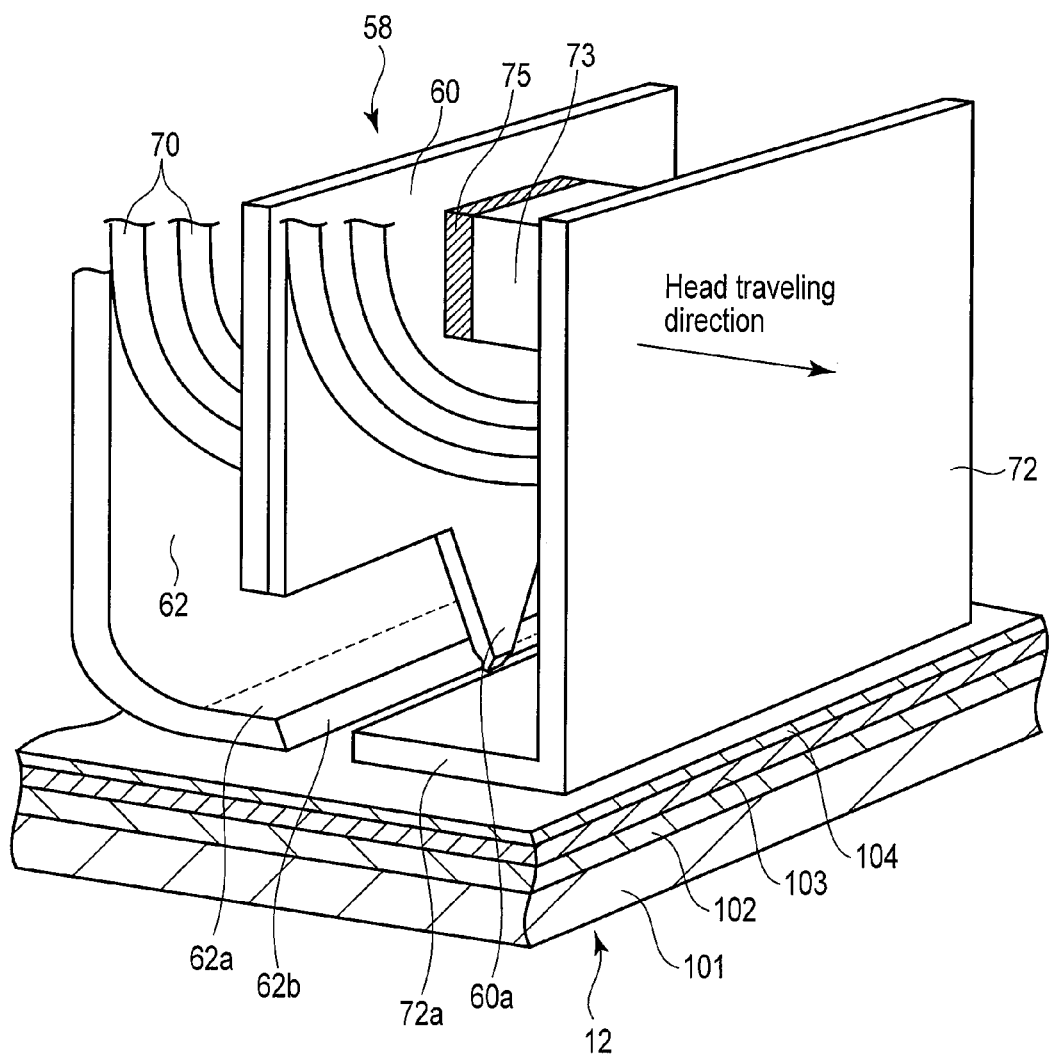
FIG. 25 is a perspective view schematically showing the recording head of the magnetic head of the HDD according to the second embodiment.

FIG. 24 is a sectional view showing a head section, particularly a recording head of a magnetic head of an HDD according to the second embodiment as an enlarged view, FIG. 25 is a perspective view schematically showing the recording head, and FIG. 26 is a plan view when the recording head is viewed from an air bearing surface side.

A recording head (magnetic recording head) 58 of an HDD according to the second embodiment is mainly different from the configuration in the first embodiment in that a leading shield magnetic pole is further included and otherwise, the configuration in the second embodiment is the same as that of a recording head according to the first embodiment. The same reference numerals as those in the first embodiment are attached to the same units as those in the first embodiment and a detailed description thereof is omitted.

According to the second embodiment, as shown in FIGS. 24 to 26, the recording head 58 of an HDD has a main pole 60 made of a soft magnetic material having high magnetic permeability and a high saturation magnetic flux density generating a recording magnetic field in a direction perpendicular to the surface (to a recording layer 103) of a magnetic disk 12, a write shield magnetic pole (trailing shield magnetic pole) 62 arranged on the trailing side of the main pole 60 with a write gap WG therebetween and made of a soft magnetic material provided to efficiently close a magnetic path via a soft magnetic layer 102 directly below the main pole, a junction 67 joining an upper portion of the main pole 60 to the write shield magnetic pole 62, a high-frequency oscillating element, for example, a spin torque oscillator 65 made of a non-magnetic conductive material arranged in a portion facing an air bearing surface between a tip portion 60a of the main pole 60 and the write shield magnetic pole 62, and a recording coil 70 arranged so as to wind around a magnetic path (magnetic circuit) including the main pole 60 and the write shield magnetic pole 62 to pass a magnetic flux to the main pole 60 when a signal is written to the magnetic disk 12. The recording head 58 further comprises a leading shield magnetic pole 72 arranged on the leading side of the main pole 60 and provided to efficiently close a magnetic path via the soft magnetic layer directly below the main pole and a recording coil 71 arranged so as to wind around a magnetic path (magnetic circuit) including the main pole 60 and the leading shield magnetic pole 72 to pass a magnetic flux to the main pole 60.

The spin torque oscillator 65 is arranged between the tip portion 60a of the main pole 60 and a tip portion of the write shield magnetic pole 62 and these are configured in the same manner as in the first embodiment. A leading side end face 62b of the write shield magnetic pole 62 opposite to the spin torque oscillator 65 and the tip portion 60a of the main pole 60 is formed by being inclined at a tilt angle θ or stepwise so as to move away from the main pole 60 (spin torque oscillator), that is, in such a way that the distance from the main pole increases when moving from an air bearing surface 43 of a slider toward the depth side in the height direction.

The leading shield magnetic pole 72 is formed in an approximately L shape and a tip portion 72a thereof is formed in an elongated rectangular shape. The tip surface of the leading shield magnetic pole 72 is exposed to the air bearing surface 43 of a slider 42. A trailing side end face 72b of the tip portion 72a is opposite to a leading side end face 60c of the main pole 60 with a gap therebetween.

Electrically insulating layers 61, 75 are arranged at the junction 67 of the main pole 60 and the write shield magnetic pole 62 and a junction 73 of the main pole 60 and the leading shield magnetic pole 72 respectively so that the main pole and the write shield magnetic pole 62 or the leading shield magnetic pole 72 are insulated from each other. The main pole 60 and the write shield magnetic pole 62 are electrically connected to respective drive terminal electrodes 63.

Also in the second embodiment configured as described above, a magnetic recording head including a spin torque oscillator is configured to be formed so as to move away from the main pole as the magnetic pole end face of a write shield magnetic pole opposite to the spin torque oscillator moves from the air bearing surface of a slider toward the depth side in the height direction and due to this configuration, the frequency of a high-frequency magnetic field (Hac) generated by the spin torque oscillator can be matched to the resonance frequency of a recording medium by mitigating the magnitude of the magnetic field (=gap magnetic field) applied to the spin torque oscillator so that perpendicular magnetization of the recording layer of the recording medium can be made to be inverted more easily. As a result of increased inversion capacity of medium magnetization recorded in the recording medium in the magnetic disk drive, signal intensity is increased and also signal degradation of recorded signals can be inhibited. Accordingly, the quality of signals recorded and stored on the magnetic disk is improved and as a result, the recording density can be improved and also signal reliability is improved. From the above, the quality of signals recorded on the magnetic disk is improved so that a magnetic recording head enabling a higher recording density and a disk drive including such a magnetic recording head can be obtained.

Third Embodiment

Next, a recording head of an HDD according to the third embodiment will be described.

Figure 29:
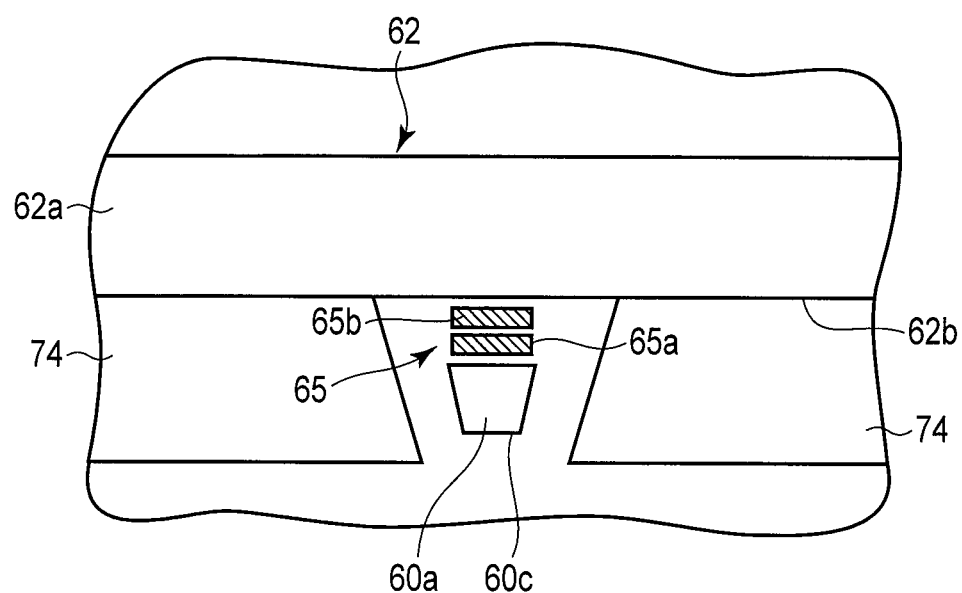
FIG. 29 is a plan view when the recording head according to the third embodiment is viewed from the air bearing surface side.

FIG. 27 is a sectional view showing a head section, particularly a recording head of a magnetic head of an HDD according to the third embodiment as an enlarged view, FIG. 28 is a perspective view schematically showing the recording head, and FIG. 29 is a plan view when the recording head is viewed from an air bearing surface side.

A recording head (magnetic recording head) 58 of an HDD according to the third embodiment is mainly different from the configuration in the first embodiment in that a side shield is further included and otherwise, the configuration in the third embodiment is the same as that of a recording head according to the first embodiment. The same reference numerals as those in the first embodiment are attached to the same units as those in the first embodiment and a detailed description thereof is omitted.

According to the third embodiment, as shown in FIGS. 27 to 29, the recording head 58 of an HDD has a main pole 60 made of a soft magnetic material having high magnetic permeability and a high saturation magnetic flux density generating a recording magnetic field in a direction perpendicular to the surface (to a recording layer) of a magnetic disk 12, a write shield magnetic pole (trailing shield magnetic pole) 62 arranged on the trailing side of the main pole 60 with a write gap WG therebetween and made of a soft magnetic material provided to efficiently close a magnetic path via a soft magnetic layer 102 directly below the main pole, a junction 67 joining an upper portion of the main pole 60 to the write shield magnetic pole 62, a high-frequency oscillating element, for example, a spin torque oscillator 65 made of a non-magnetic conductive material arranged in a portion facing an air bearing surface 43 between a tip portion 60a of the main pole 60 and the write shield magnetic pole 62, and a recording coil 70 arranged so as to wind around a magnetic path (magnetic circuit) including the main pole 60 and the write shield magnetic pole 62 to pass a magnetic flux to the main pole 60 when a signal is written to the magnetic disk 12. The recording head 58 comprises a pair of side shields 74 made of a soft magnetic material arranged on both sides of the main pole 60 in the track width direction by magnetically being separated on the main pole 60 and the air bearing surface 43.

The pair of side shields 74 are formed from a high-permeability material integrally with a tip portion 62a of the write shield magnetic pole 62 and protrude from a leading side end face 62b of the tip portion 62a toward a leading end side of a slider 42. Each of the side shields 74 extends from the leading side end face 62b of the write shield magnetic pole 62 up to a level position beyond a leading side end face 60c of the main pole 60.

The spin torque oscillator 65 is arranged between the tip portion of the main pole 60 and the tip portion of the write shield magnetic pole 62 and these are configured in the same manner as in the first embodiment. The leading side end face 62b of the write shield magnetic pole 62 opposite to the spin torque oscillator 65 and the tip portion 60a of the main pole 60 is formed by being inclined at a tilt angle θ or stepwise so as to move away from the main pole 60 (spin torque oscillator), that is, in such a way that the distance from the main pole increases when moving from the air bearing surface 43 of the slider toward the depth side in the height direction.

Also, in the third embodiment configured as described above, the frequency of a high-frequency magnetic field (Hac) generated by the spin torque oscillator can be matched to the resonance frequency of a recording medium by mitigating the magnitude of the magnetic field (=gap magnetic field) applied to the spin torque oscillator so that perpendicular magnetization of the recording layer of the recording medium can be made to be inverted more easily. As a result of increased inversion capacity of medium magnetization recorded in the recording medium in the magnetic disk drive, signal intensity is increased and also signal degradation of recorded signals can be inhibited. Accordingly, the quality of signals recorded and stored on the magnetic disk is improved and as a result, the recording density can be improved and also signal reliability is improved. From the above, the quality of signals recorded on the magnetic disk is improved so that a magnetic recording head enabling a higher recording density and a disk drive including such a magnetic recording head can be obtained.

Fourth Embodiment

Next, a recording head of an HDD according to the fourth embodiment will be described.

Figure 30:
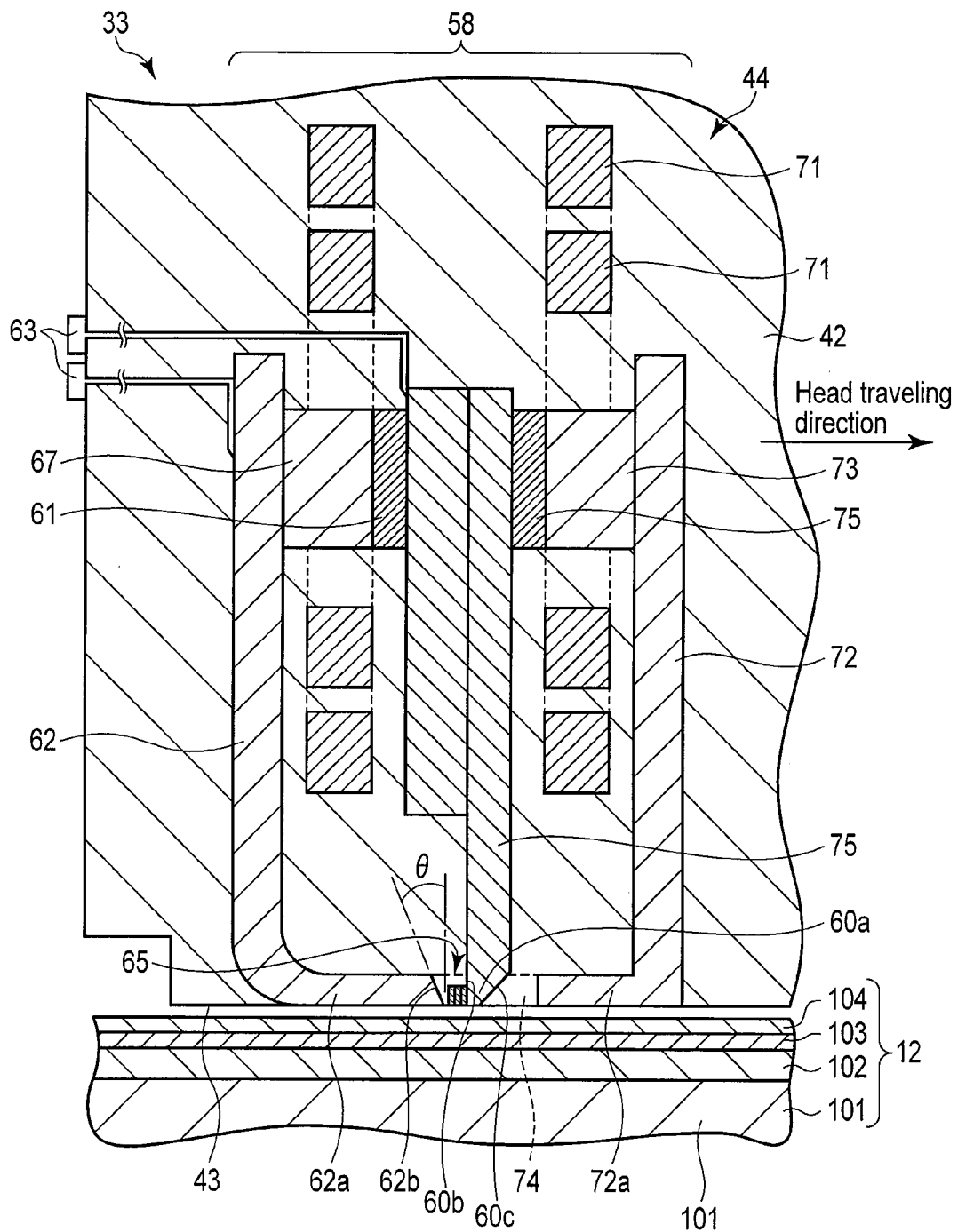
FIG. 30 is a sectional view showing a recording head of a magnetic head of an HDD according to a fourth embodiment.
Figure 31:
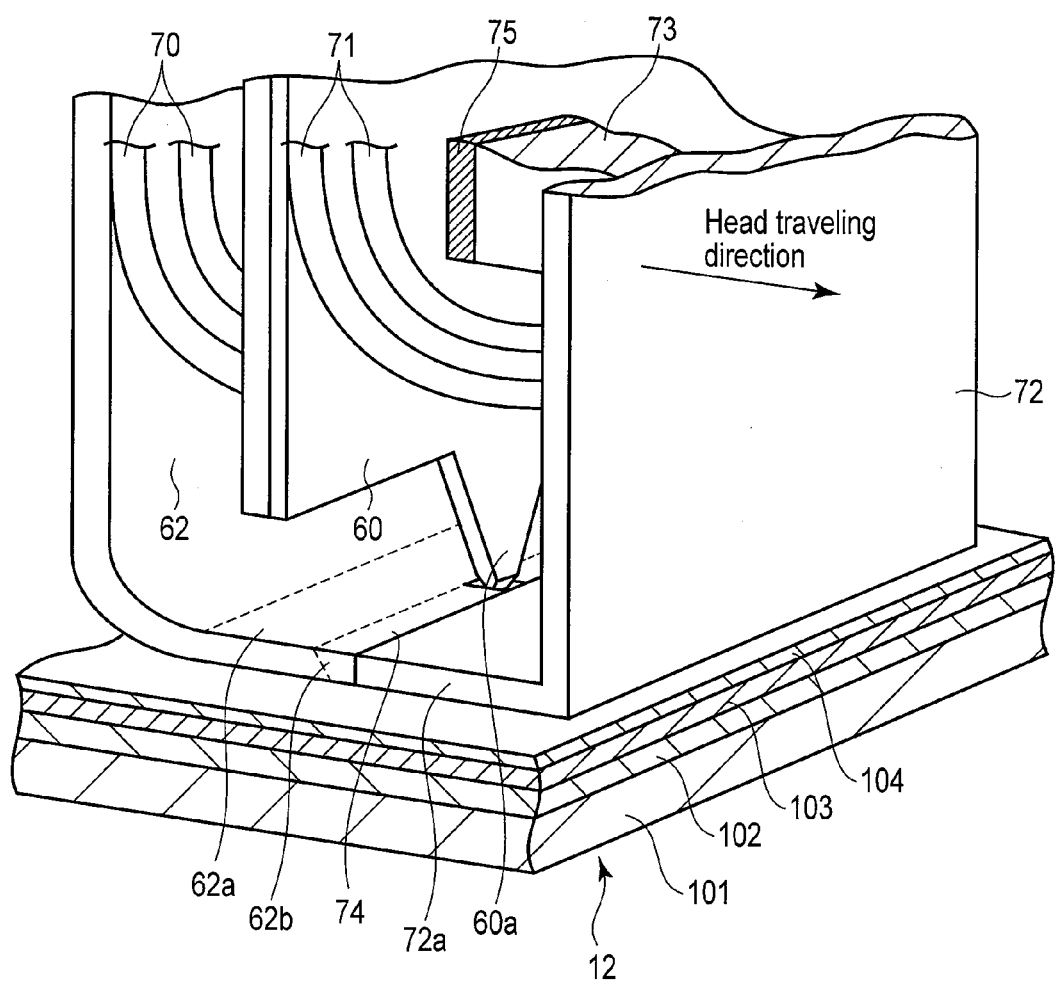
FIG. 31 is a perspective view schematically showing the recording head of the magnetic head of the HDD according to the fourth embodiment.

FIG. 30 is a sectional view showing a head section, particularly a recording head of a magnetic head of an HDD according to the fourth embodiment as an enlarged view, FIG. 31 is a perspective view schematically showing the recording head, and FIG. 32 is a plan view when the recording head is viewed from an air bearing surface side.

A recording head 58 of an HDD according to the fourth embodiment is mainly different from the configuration in the first embodiment in that a leading shield magnetic pole and a side shield are further included and otherwise, the configuration in the fourth embodiment is the same as that of the recording head according to the first embodiment. The same reference numerals as those in the first embodiment are attached to the same units as those in the first embodiment and a detailed description thereof will be omitted.

According to the fourth embodiment, as shown in FIGS. 30 to 32, the recording head 58 of an HDD has a main pole 60 made of a soft magnetic material having high magnetic permeability and a high saturation magnetic flux density generating a recording magnetic field in a direction perpendicular to the surface (to a recording layer) of a magnetic disk 12, a write shield magnetic pole (trailing shield magnetic pole) 62 arranged on the trailing side of the main pole 60 with a write gap WG therebetween and made of a soft magnetic material provided to efficiently close a magnetic path via a soft magnetic layer 102 directly below the main pole, a junction 67 joining an upper portion of the main pole 60 to the write shield magnetic pole 62, a high-frequency oscillating element, for example, a spin torque oscillator 65 made of a non-magnetic conductive material arranged in a portion facing an air bearing surface between a tip portion 60a of the main pole 60 and the write shield magnetic pole 62, and a recording coil 70 arranged so as to wind around a magnetic path (magnetic circuit) including the main pole 60 and the write shield magnetic pole 62 to pass a magnetic flux to the main pole 60 when a signal is written to the magnetic disk 12. The recording head 58 comprises a leading shield magnetic pole 72 arranged on the leading side of the main pole 60 and provided to efficiently close a magnetic path via the soft magnetic layer directly below the main pole, a recording coil 71 arranged so as to wind around a magnetic path (magnetic circuit) including the main pole and the leading shield magnetic pole to pass a magnetic flux to the main pole 60, and a pair of a pair of side shields 74 made of a soft magnetic material arranged on both sides of the main pole 60 in the track width direction by magnetically being separated on the main pole 60 and an air bearing surface 43.

The pair of side shields 74 are formed from a high-permeability material integrally with a tip portion 62a of the write shield magnetic pole 62 and protrude from a leading side end face 62b of the tip portion 62a toward a leading end side of a slider 42. Each of the side shields 74 extends from the leading side end face of the write shield magnetic pole 62 up to a level position beyond a leading side end face 60c of the main pole 60.

The leading shield magnetic pole 72 is formed in an approximately L shape and a tip portion 72a thereof is formed in an elongated rectangular shape. The tip surface of the leading shield magnetic pole 72 is exposed to the air bearing surface 43 of a slider 42. A trailing side end face 72b of the tip portion 72a is opposite to a leading side end face 60c of the main pole 60 with a gap therebetween and is further joined to a tip surface of the pair of side shields 74. In the present embodiment, the leading shield magnetic pole 72 is formed of a soft magnetic material integrally with the write shield magnetic pole 62 and the side shields 74.

Electrically insulating layers 61, 75 are arranged at the junction 67 of the main pole 60 and the write shield magnetic pole 62 and a junction 73 of the main pole 60 and the leading shield magnetic pole 72 respectively so that the main pole and the write shield magnetic pole 62 or the leading shield magnetic pole 72 are insulated from each other. Portions of the main pole 60 and the write shield magnetic pole 62 are electrically connected to respective drive terminal electrodes 63.

The spin torque oscillator 65 is arranged between the tip portion of the main pole 60 and the tip portion of the write shield magnetic pole 62 and these are configured in the same manner as in the first embodiment. The leading side end face 62b of the write shield magnetic pole 62 opposite to the spin torque oscillator 65 and the tip portion 60a of the main pole 60 is formed by being inclined at a tilt angle θ or stepwise so as to move away from the main pole 60 and the spin torque oscillator 65, that is, in such a way that the distance from the main pole increases when moving from the air bearing surface 43 of the slider toward the depth side in the height direction.

Also, in the fourth embodiment configured as described above, the frequency of a high-frequency magnetic field (Hac) generated by the spin torque oscillator can be matched to the resonance frequency of a recording medium by mitigating the magnitude of the magnetic field (=gap magnetic field) applied to the spin torque oscillator so that perpendicular magnetization of the recording layer of the recording medium can be made to be inverted more easily. As a result of increased inversion capacity of medium magnetization recorded in the recording medium in the magnetic disk drive, signal intensity is increased and also signal degradation of recorded signals can be inhibited. Accordingly, the quality of signals recorded and stored on the magnetic disk is improved and as a result, the recording density can be improved and also signal reliability is improved. From the above, the quality of signals recorded on the magnetic disk is improved so that a magnetic recording head enabling a higher recording density and a disk drive including such a magnetic recording head can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the material, shape, size and the like of elements constituting a head section can be changed when necessary. Also, magnetic disks and magnetic heads in a magnetic disk drive can be added when necessary and various sizes can be selected for the magnetic disk. Moreover, the first and second modifications described above may be applied to the second to fourth embodiments described above.

What is claimed is:

1. A magnetic recording head comprising:
   a main pole configured to generate a magnetic field in a direction perpendicular to a recording layer of a recording medium,
   a write shield magnetic pole opposite to a trailing side of the main pole with a gap,
   a coil configured to excite a magnetic flux in a magnetic circuit formed by the main pole and the write shield magnetic pole, and
   a high-frequency oscillator provided between a tip portion of the main pole on a side of the recording medium and the write shield magnetic pole and configured to generate a high-frequency magnetic field, wherein
   the write shield magnetic pole comprises an end face opposite to the high-frequency oscillator and the end face is formed so that a distance from the main pole increases with an increasing distance from the recording medium.

2. The magnetic recording head of claim 1, wherein the end face of the write shield magnetic pole is tilted from the main pole toward the trailing side with respect to a direction perpendicular to the recording layer of the recording medium so that the distance from the main pole increases with the increasing distance from the recording medium.

3. The magnetic recording head of claim 2, wherein the end face of the write shield magnetic pole is tilted stepwise from the main pole toward the trailing side when moving away from the recording layer so that the distance from the main pole increases with the increasing distance from the recording medium.

4. The magnetic recording head of claim 3, wherein the end face of the write shield magnetic pole is tilted toward the trailing side from a position on the side of the recording medium lower than a height of the high-frequency oscillator.

5. The magnetic recording head of claim 4, further comprising a junction portion configured to physically join the main pole and the write shield magnetic pole at a position away from the recording medium, wherein the junction portion comprises an insulating layer electrically insulating the main pole and the write shield magnetic pole.

6. The magnetic recording head of claim 5, further comprising side shields arranged on both sides of the main pole in a track width direction with a gap to the main pole.

7. The magnetic recording head of claim 5, further comprising a leading shield magnetic pole arranged on a leading side of the main pole with a gap therebetween to form a magnetic circuit together with the main pole.

8. The magnetic recording head of claim 6, further comprising a leading shield magnetic pole arranged on a leading side of the main pole with the gap therebetween to form a magnetic circuit together with the main pole, wherein the leading shield magnetic pole is formed together with the side shields.

9. The magnetic recording head of claim 1, wherein the end face of the write shield magnetic pole is tilted toward the trailing side from a position on the side of the recording medium lower than a height of the high-frequency oscillator.

10. The magnetic recording head of claim 2, wherein the end face of the write shield magnetic pole is tilted toward the trailing side from a position on the side of the recording medium lower than a height of the high-frequency oscillator.

11. The magnetic recording head of claim 1, further comprising a junction portion configured to physically join the main pole and the write shield magnetic pole at a position away from the recording medium, wherein the junction portion comprises an insulating layer electrically insulating the main pole and the write shield magnetic pole.

12. The magnetic recording head of claim 1, further comprising side shields arranged on both sides of the main pole in a track width direction with a gap to the main pole.

13. The magnetic recording head of claim 1, further comprising a leading shield magnetic pole arranged on a leading side of the main pole with a gap therebetween to form a magnetic circuit together with the main pole.

14. A magnetic disk drive comprising:
   a recording medium comprising a magnetic recording layer having magnetic anisotropy in a direction perpendicular to a medium surface;
   a drive unit configured to rotate the recording medium; and
   the magnetic recording head of claim 1 configured to perform information processing for the recording medium.

15. The magnetic disk drive of claim 14, wherein the end face of the write shield magnetic pole is tilted from the main pole toward the trailing side with respect to a direction perpendicular to the recording layer of the recording medium so that the distance from the main pole increases with the increasing distance from the recording medium.

16. The magnetic disk drive of claim 14, wherein the end face of the write shield magnetic pole is tilted stepwise from the main pole toward the trailing side when moving away from the recording layer so that the distance from the main pole increases with the increasing distance from the recording medium.

17. The magnetic disk drive of claim 14, wherein the end face of the write shield magnetic pole is tilted toward the trailing side from a position on the side of the recording medium lower than a height of the high-frequency oscillator.

18. The magnetic disk drive of claim 14, wherein the magnetic recording head comprises a junction portion configured to physically join the main pole and the write shield magnetic pole at a position away from the recording medium, wherein the junction portion comprises an insulating layer electrically insulating the main pole and the write shield magnetic pole.

19. The magnetic disk drive of claim 14, wherein the magnetic recording head comprises side shields arranged on both sides of the main pole in a track width direction with a gap to the main pole.

20. The magnetic disk drive of claim 14, wherein the magnetic recording head comprises a leading shield magnetic pole arranged on a leading side of the main pole with a gap therebetween to form a magnetic circuit together with the main pole.

* * * * *